United States Patent
Giaquinta et al.

(10) Patent No.: US 10,591,796 B1
(45) Date of Patent: Mar. 17, 2020

(54) THIN FILM LITHIUM TUNGSTEN OXIDES FOR ELECTROCHROMIC APPLICATIONS AND METHODS OF MAKING THE SAME

(71) Applicant: Kinestral Technologies, Inc., South San Francisco, CA (US)

(72) Inventors: Daniel Giaquinta, South San Francisco, CA (US); Brian Wiers, South San Francisco, CA (US); John David Bass, South San Francisco, CA (US); Scott Gamble, South San Francisco, CA (US); Gregory Daniloff, South San Francisco, CA (US); Hugues Duncan, South San Francisco, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 185 days.

(21) Appl. No.: 15/845,973

(22) Filed: Dec. 18, 2017

Related U.S. Application Data

(60) Provisional application No. 62/435,528, filed on Dec. 16, 2016.

(51) Int. Cl.
  *B32B 15/04* (2006.01)
  *B32B 17/06* (2006.01)
  *G02F 1/1523* (2019.01)

(52) U.S. Cl.
  CPC .................. *G02F 1/1523* (2013.01)

(58) Field of Classification Search
  USPC .................. 428/426, 432, 688, 701, 702
  See application file for complete search history.

(56) References Cited

U.S. PATENT DOCUMENTS

| | | | | |
|---|---|---|---|---|
| 5,707,556 | A * | 1/1998 | Babinec | C09K 9/00 252/518.1 |
| 7,265,891 | B1 * | 9/2007 | Demiryont | G02F 1/1523 252/62.2 |
| 2004/0048157 | A1 * | 3/2004 | Neudecker | H01M 4/0421 429/231.2 |
| 2010/0243427 | A1 * | 9/2010 | Kozlowski | C03C 17/3417 204/192.1 |
| 2011/0151283 | A1 * | 6/2011 | Gillaspie | G02F 1/1525 429/7 |
| 2011/0267674 | A1 * | 11/2011 | Wang | B32B 17/10513 359/273 |
| 2012/0275008 | A1 * | 11/2012 | Pradhan | G02F 1/1525 359/265 |
| 2014/0205748 | A1 * | 7/2014 | Choi | G02F 1/1523 427/123 |

\* cited by examiner

*Primary Examiner* — Lauren R Colgan
(74) *Attorney, Agent, or Firm* — Womble Bond Dickinson (US) LLP

(57) ABSTRACT

An electrochromic multi-layer stack is provided. The electrochromic multi-layer stack includes a thin film that includes lithium tungsten oxide with lithium included in the fully bleached state. The electrochromic multi-layer stack also includes an electrically conductive layer, and an outer substrate. An electrochromic device is also provided.

11 Claims, 16 Drawing Sheets

LIBS of Lithium Tungsten Oxide Films

THIN FILM LITHIUM TUNGSTEN OXIDES FOR ELECTROCHROMIC APPLICATIONS AND METHODS OF MAKING THE SAME

FIELD OF THE INVENTION

The present disclosure generally relates to electrochromic devices, such as windows or interior partitions. These devices include a lithium tungsten oxide cathodic electrochromic layer that may be formed by liquid deposition processes such as sol-gel.

BACKGROUND

Commercial switchable glazing devices, also commonly known as smart windows and electrochromic window devices, are well known for use as mirrors in motor vehicles, aircraft window assemblies, sunroofs, skylights, and architectural windows. Such devices may comprise, for example, active inorganic electrochromic layers, organic electrochromic layers, inorganic ion-conducting layers, organic ion-conducting layers and hybrids of these sandwiched between two conducting layers. When a voltage is applied across these conducting layers the optical properties of a layer or layers in between change. Such optical property changes typically include a modulation of the transmissivity of the visible or the solar sub-portion of the electromagnetic spectrum.

The broad adoption of electrochromic window devices in the construction and automotive industries will require a ready supply of low cost, aesthetically appealing, durable products in large area formats. Electrochromic window devices based on metal oxides represent the most promising technology for these needs. Typically, such devices comprise two electrochromic materials (a cathode and an anode) or sometimes a coloring and a charge storage layer, separated by an ion-conducting film and sandwiched between two transparent conducting oxide (TCO) layers. In operation, a voltage is applied across the device that causes current to flow in the external circuit, oxidation and reduction of the electrode materials and, to maintain charge balance, mobile cations to enter or leave the electrodes. This facile electrochemical process causes the window to reversibly change from a more bleached (e.g., a relatively greater optical transmissivity) to a more darkened state (e.g., a relatively lesser optical transmissivity).

For long-term operation of an electrochromic window, the components within the device must be well-matched; e.g., the electrochemical potentials of the electrodes over their states of charge should be within the voltage stability window of the ion conductor and of the TCO material. If not, electron transfer will occur between the electrode materials and the other window components causing, for example, leakage current, electrolyte consumption, buildup of reaction products on the electrode(s) and, in general, significantly shortening the useful lifespan of the window.

TCO materials typically used in electrochromic windows such as FTO and ITO react with lithium at voltages below ~1V vs. $Li/Li^+$, lowering their electrical performance and darkening the material. Electrolytes typically incorporated into the ion conductor, or the presence of water or protic impurities, have voltage stability windows between ~1 and ~4.5 V vs. $Li/Li^+$. Therefore, it is beneficial to use electrode materials that undergo redox events within these limits. For example, lithium nickel oxide ($LiNiO_x$) is an anodic electrochromic material that is bleached at about 2.5 V vs. $Li/Li^+$ and darkens upon oxidation, typically to about 4.0 V vs. $Li/Li^+$.

Certain tungsten oxide based materials darken cathodically to produce a darkened state transmission spectrum that is complementary to $LiNiO_x$ and therefore can be partnered with $LiNiO_x$ in electrochromic windows. Certain methods for the preparation of $WO_3$ thin films have been reported in the literature.

Tungsten oxides are well-known EC-active materials. Uncertainty exists in the literature, however, regarding whether crystalline or amorphous materials are preferred. In addition, while tungsten trioxide ($WO_3$) crystallizes in several polymorphs, there is no clear preference as to which polymorph is best, or whether demonstrable differences should be expected. Crystallinity, the degree of crystallinity, and the crystal system obtained varies with synthesis method, temperature, the use of additives and other considerations. One of the crystal phases of $WO_3$ that has been studied by certain processing techniques is hexagonal $WO_3$ (i.e., $h$-$WO_3$). There are some examples of hexagonal $WO_3$ (i.e. $h$-$WO_3$) for battery (i.e. electrochemical) and EC applications in the prior art. Commonly utilized synthetic methods such as PVD and electrodeposition, however, are not always amenable to the preparation of single phase, crystalline $h$-$WO_3$. Instead, $h$-$WO_3$ has been produced via hydrothermal synthesis, growing nanostructures directly on substrates, and producing nanostructures in solution.

Other crystal phases of $WO_3$ have other symmetries and may be described as triclinic $WO_3$ or monoclinic $WO_3$ or cubic $WO_3$, as is appropriate based on their symmetries. In general, if the composition is the same but the arrangement of the atoms in the crystal phase is similar but differ in symmetry, the crystal phase may be described strictly by its symmetry. In certain circumstances, however, the arrangement of the atoms in the crystal phase may be unique beyond simple distortions that alter the lattice symmetry. In such cases, the use of structure types in addition to a symmetry descriptor is useful.

Tungsten oxide thus may be described as displaying a number of polymorphs. The term polymorph describes symmetry changes that largely maintain some or all of the same atomic connectivity and unique relationships of atoms that produce unique structural features. Sometimes, however, polymorph may describe an entirely different structure and atomic arrangement but with the same composition. Critically, the synthesis and/or thin film deposition method can impact the resulting polymorph. For instance, thermally evaporated tungsten oxide is commonly amorphous especially if the substrate is not heated. The resulting films can be crystallized by post-deposition annealing (e.g., in air), however, the resulting crystal structure of the tungsten trioxide so produced is typically monoclinic perovskite. Monoclinic perovskite tungsten oxide is known to undergo phase transformations upon intercalation (e.g. with Li). [Nonstoichiometric Compounds; Ward, R.; Advances in Chemistry; Chapter 23, pp 246-253, American Chemical Society: Washington, D.C., 1963.] Examples of tungsten trioxide materials that typically occur in different structures or symmetries are sol-gel prepared materials and commercially available nanostructured materials which typically have the "Perovskite Tungsten Bronze" [or PTB] structure. The PTB structure may be described as similar to $ReO_3$ in which metal (M) ions (usually monovalent) are intercalated into interstitial spaces of the $ReO_3$ structure resulting in $M_xReO_3$ and the perovskite structure type. Also, it is well known in the literature that thermally evaporated films that have subsequently been crystallized by annealing show worse durability than the amorphous tungsten trioxide thermally evaporated films in electrochromic devices.

Another polymorph of $WO_3$ is the cubic pyrochlore. Sometimes the stoichiometry is represented with waters of hydration and sometimes with hydroxides. Sometimes the stoichiometry is represented with counter ions and sometimes the stoichiometry is doubled, e.g. $[—]W_2O_6$. For simplicity, the pyrochlore phase will be described here as part of the $WO_3$ series and explained as a substituted $WO_3$ when additional metals are present.

The term "tungsten trioxide" as used herein refers to a material with the formula $A_y W_{1-x} M_x O_{3\pm z} \cdot kH_2O$) and has any crystal structure where A is situated within interstitial spaces and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. Under these conditions, x is from 0 to 1, y is from 0 to 0.5, and where z can be 0. A and/or M also comprise more than one element and be expressed as $A'_a + A''_b + A'''_c$ and/or $M'_d + M''_e + M'''_f$ where A', A" and A''' and/or M', M" and M''' are different elements, where $a+b+c=y$ and $d+e+f=x$. "Tungsten trioxide" can therefore refer to materials comprising atoms other than tungsten and oxygen, including but not limited to, substituted tungsten oxide, substituted triclinic tungsten oxide, substituted monoclinic tungsten oxide, substituted orthorhombic tungsten oxide, substituted tetragonal tungsten oxide, substituted hexagonal tungsten oxide, or substituted cubic tungsten oxide. Furthermore, "tungsten trioxide" can refer to structures comprising hexagonal tungsten bronze, hexagonal tungsten bronze-like materials, tetragonal tungsten bronze, tetragonal tungsten bronze-like materials, pyrochlore materials, pyrochlore-like materials, defected pyrochlore materials, defected pyrochlore-like materials, substituted pyrochlore materials or substituted pyrochlore-like materials.

Although a range of electrochromic cathodic materials have been proposed to date, there is a need for cathode films that can be prepared by simple single-step deposition processes to produce EC cathodes with improved thermal stability, electrochemical/electrochromic durability, high optical clarity in their as-deposited states, and that can be tuned via composition and film thickness to adopt a wide variety of area charge capacities and optical switching properties.

Figure 1:
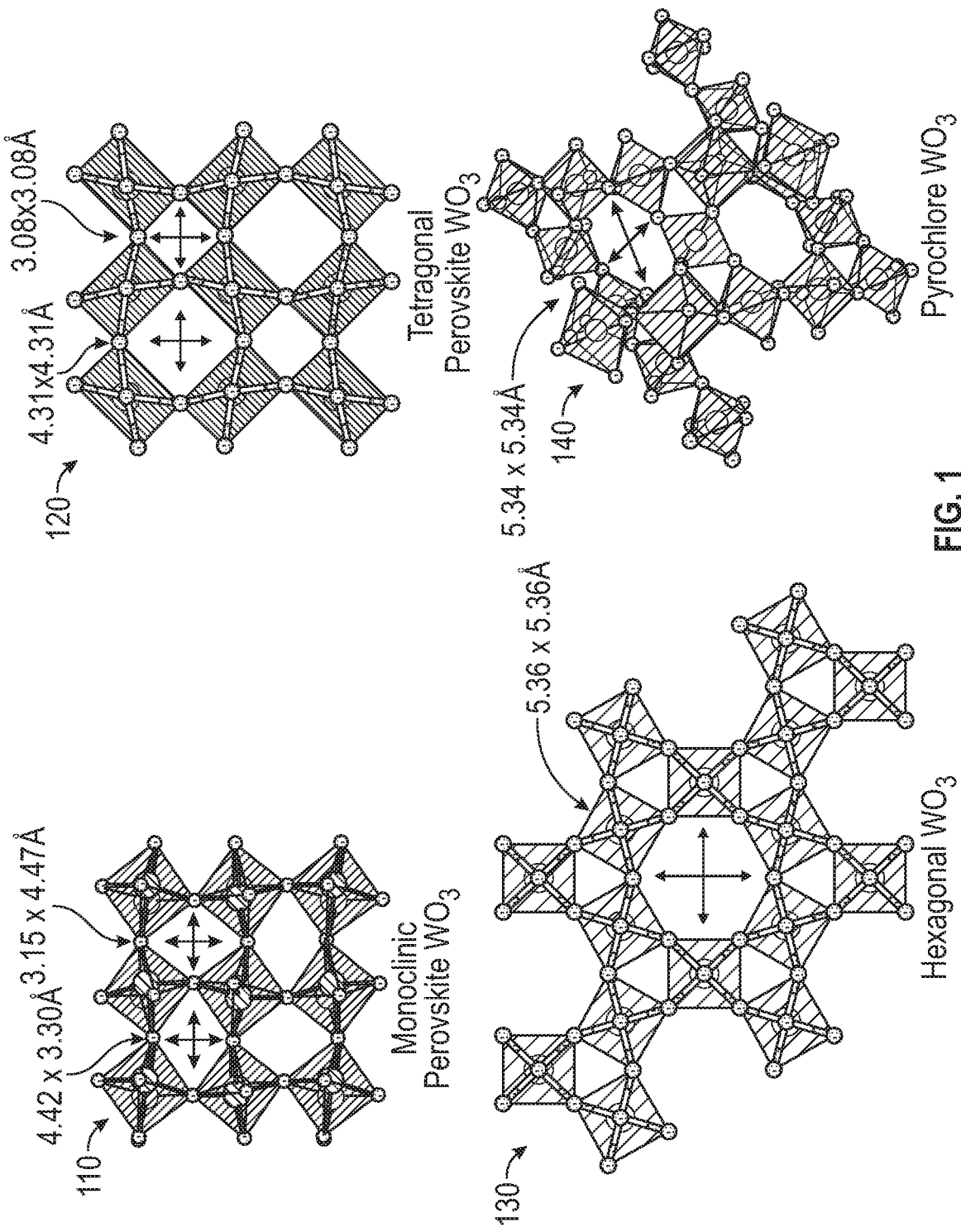
FIG. 1 shows different tungsten trioxide polymorphs, specifying the size of the interstitial sites.

Corresponding reference characters indicate corresponding parts throughout the drawings. Additionally, relative thicknesses of the layers in the different figures do not represent the true relationship in dimensions. For example, the substrates are typically much thicker than the other layers. Unless dimensions are explicitly noted, the figures are drawn only to illustrate connection principles, not to give any dimensional information.

ABBREVIATIONS AND DEFINITIONS

The following definitions and methods are provided to better define the present disclosure and to guide those of ordinary skill in the art in the practice of the present disclosure. Unless otherwise noted, terms are to be understood according to conventional usage by those of ordinary skill in the relevant art.

The term "alkoxide" as used herein refers to a deprotonated alcohol and is typically used to describe a metal complex of the form $M^1$-OR where $M^1$ is a metal.

The terms "anodic electrochromic layer" and "anodic electrochromic material" refer to an electrode layer or electrode material, respectively, that upon the removal of ions and electrons becomes less transmissive to visible radiation.

The term "bleach" refers to the transition of an electrochromic material from a first optical state to a second optical state wherein the first optical state is less transmissive than the second optical state.

The terms "cathodic electrochromic layer" and "cathodic electrochromic material" refer to an electrode layer or electrode material, respectively, that upon the insertion of ions and electrons becomes less transmissive to visible radiation.

The term "coloration efficiency" or "CE" refers to a property of an electrochromic layer that quantifies how the optical density of an electrochromic layer changes as a function of its state of charge. CE can vary significantly depending on layer preparation due to differences in structure, material phases, and/or composition. These differences affect the probability of electronic transitions that are manifest as color. As such, CE is a sensitive and quantitative descriptor of an electrochromic layer encompassing the ensemble of the identity of the redox centers, their local environments, and their relative ratios. CE is calculated from the ratio of the change in optical absorbance to the amount of charge density passed. In the absence of significant changes in reflectivity, this wavelength dependent property can be measured over a transition of interest using the following equation:

$$CE_\lambda = \frac{\log_{10}[f0]\left(\frac{T_{ini}}{T_{final}}\right)}{Q_A}$$

where $Q_A$ is the charge per area passed, $T_{ini}$ is the initial transmission, and $T_{final}$ is the final transmission. For cathodically coloring layers this value is positive. A simple electro-optical setup that simultaneously measures transmission and charge can be used to calculate CE. Alternatively, the end transmission states can be measured ex situ before and after electrical switching. CE is sometimes alternatively reported on a natural log basis, in which case the reported values are approximately 2.3 times larger.

The term "darken" refers to the transition of an electrochromic material from a first optical state to a second optical state wherein the first optical state is more transmissive than the second optical state.

The term "electrochromic material" refers to materials that change in transmissivity to visible radiation, reversibly, as a result of the insertion or extraction of ions and electrons. For example, an electrochromic material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically and optically matched" (EOM) refers to a set of cathode and anode electrochromic films with similar charge capacities, that are in their complementary optical states (e.g., both in their bleached state, or both in their darkened state or both in an intermediate state of coloration) such that when joined together by a suitable ion-conducting and electrically insulating layer, a functional electrochromic device is formed that shows reversible switching behavior.

The term "fully bleached state" as used in connection with a cathodic electrochromic material refers to the state of the cathodic electrochromic material when the material is held at 3.4 V with respect to Li/Li$^+$ for a time period greater than or equal to 1 hour at 85° C. in an electrochemical half-cell in a propylene carbonate solution containing 1 M lithium perchlorate (under anhydrous conditions and in an Ar atmosphere).

The "L*a*b* color" space is used herein to describe the color of the substrate or device in the bleached or colored state. In this color space, L* indicates the lightness with the darkest black at L*=0 and the brightest white at L*=100, a* indicates the red/green component of color with green at negative a* and red at positive a* values, and b* indicates the yellow/blue component of color with blue at negative b* and yellow at positive b* values. The L*a*b* color space is also referred to as the CIE L*a*b* (CIELAB) color space, which is specified by the International Commission on Illumination (or in French, Commission Internationale de L'Eclairage) hence its CIE initialism).

The "photopic transmittance ratio" (i.e. the "photopic ratio") is the transmittance of device in the bleached state divided by the transmittance of device in colored state over the visible range of the electromagnetic spectrum (e.g., wavelengths of electromagnetic radiation greater than or equal to approximately 380 nanometers and less than or equal to approximately 780 nanometers), weighted by a photopic sensitivity curve (i.e., an average sensitivity of a human eye).

The photopic transmittance ratio can refer to the transmittance of the multi-layer stack in FIG. 1 in the more optically transmissive state versus the less optically transmissive state over the visible range of the electromagnetic spectrum (e.g., wavelengths of electromagnetic radiation greater than or equal to approximately 380 nanometers and less than or equal to approximately 780 nanometers) weighted by a photopic sensitivity curve (i.e., an average sensitivity of a human eye). The photopic transmittance $\tau_s(p)$ for a given optically transmissive state can be calculated by the following equation:

$$\tau_s(p) = \frac{\int_{\lambda_{min}}^{\lambda_{max}} \tau_s(\lambda)I_p(\lambda)d\lambda}{\int_{\lambda_{min}}^{\lambda_{max}} I_p(\lambda)d\lambda}$$

where $\lambda_{max}$ is the maximum wavelength of the visible range (e.g., 780 nanometers), $\lambda_{min}$ is the minimum wavelength of the visible range (e.g., 380 nanometers), $\tau_s(\lambda)$ is the transmittance of the multi-layer stack in a given state at any wavelength in the visible range, and $I_p(\lambda)$ is the photopic intensity function.

Accordingly, the photopic transmittance ratio can be represented by the following expression:

$$\frac{\tau_m(p)}{\tau_l(p)}$$

where $\tau_m(p)$ is the photopic transmittance in the more optically transmissive state and $\tau_l(p)$ is the photopic transmittance in the less optically transmissive state.

The term "polymorph" herein may refer to materials in which the crystal symmetry changes while largely maintaining some or all of the atomic connectivity and unique relationships of atoms that produce unique structural features, or may describe an entirely different structure and atomic arrangement but with the same composition.

The term "switching rate" refers to the reduction in capacity observed when the electrochromic film (cathode or anode) is switched at a current I equal to the initial Q (C)/120 s rather than being switched with a current cutoff of 25×10$^{-6}$ Amp. In other words, switching rate is the percent loss of the charge capacity when the constant current was applied for the materials to switch within 2 minutes. In other words, the term "switching rate" refers to the ratio of the charge Q2/Q1, where Q2 is obtained when galvanostatically cycling between two potential limits with a current I=Q/120 s, and Q1 is determined by cycling galvanostatically between the two same potential limits with a current cutoff I=$25*10^{-6}$ A.

The term "ability to switch" refers to the percentage of maximum capacity reached when the cathodic electrochromic film is reduced at a 30 C-rate with a 2.3V cutoff limit, where the "maximum capacity" is the capacity reached while the film is held at 2.3V with a current cutoff of $25\times10^{-6}$ Amp. High "ability to switch" would be exemplified by a material that reaches maximum capacity at a 30 C-rate while the applied voltage remains above 2.3V. Low "ability to switch" would be exemplified by a material that reaches a low percentage of maximum capacity at a 30 C-rate while the applied voltage is 2.3V.

The term "thermal treatment" refers to calcination, annealing, sintering, hydrothermal methods and many others known in the art. The atmosphere of these methods may be the same or different, and may include ambient atmospheres, inert atmospheres, reactive atmospheres or combinations. Thermal treatment may imply a series of heating steps such as calcination followed by annealing, for example, and is not intended to be limiting.

The term "transmissivity" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 380-780 nm using the spectral photopic efficiency $I_P(\lambda)$ (CIE, 1924) as a weighting factor. (Ref: ASTM E1423).

The term "transparent" is used to denote substantial transmission of visible radiation through a material such that, for example, bodies situated beyond or behind the material can be distinctly seen or imaged using appropriate image sensing technology.

DETAILED DESCRIPTION

Embodiments of the current invention describe lithium tungsten oxide thin films that are cathodic electrochromic layers with a range of desirable properties and characteristics. In some embodiments, the lithium tungsten oxide thin films have the formula $Li_xWO_{3+y}$, wherein x is greater than 0 and less than or equal to 1, and y is greater than 0 and less than or equal to 0.5 in the fully bleached state. In some embodiments, the lithium tungsten oxide thin films have the formula $Li_xWO_{3+y}$, wherein x is greater than 0 and less than or equal to 0.5, and y is greater than 0 and less than or equal to 0.25 in the fully bleached state. In some embodiments, the lithium tungsten oxide thin films have an optical transmission at 550 nm of greater than 80%, or greater than 90% in the fully bleached state. In some embodiments, the lithium tungsten oxide thin films have a b* from −5 to 5, or from −2 to 2 in the fully bleached state. In some embodiments, the lithium tungsten oxide thin films have an optical transmission at 550 nm of less than 15% in the darkened state. In some embodiments, the lithium tungsten oxide thin films have a coloration efficiency greater than 10 $cm^2/C$.

In some embodiments, the lithium tungsten oxide is deposited by sol-gel processing. In some embodiments, the lithium tungsten oxide is deposited by sol-gel processing, and the liquid mixture precursors contain an alkali metal, or an alkaline earth metal. In some embodiments, the liquid mixture precursors contain lithium. In some embodiments, the lithium tungsten oxide films deposited from alkali metal- or alkaline earth metal-containing liquid mixture precursors exhibit a perovskite crystal structure. In some embodiments, the lithium tungsten oxide films deposited by sol-gel processing tend to have different crystal structures when the liquid mixture precursors contain an alkali metal, or alkaline earth metal, than tungsten trioxide films deposited from liquid mixture precursors without an alkali metal, or alkaline earth metal. Not to be limited by theory, the liquid mixture precursors containing an alkali metal, or alkaline earth metal, can act as directing agents that alter the growth of the tungsten trioxide, or lithium tungsten oxide. Not to be limited by theory, the liquid mixture precursors containing an alkali metal, or alkaline earth metal, can also change the local environment in the sol-gel liquid mixture as the film is being deposited, or change the reaction pathways during sol-gel processing.

In some embodiments, the lithium tungsten oxide thin films have a perovskite crystal structure. FIG. 1 illustrates four different polymorphs of tungsten trioxide: monoclinic perovskite 110, tetragonal perovskite 120, hexagonal tungsten trioxide 130 and pyrochlore 140. The dimensions of the largest interstitial sites are also shown. The channels throughout the hexagonal tungsten trioxide 130 and pyrochlore 140 structures are the largest, with characteristic dimensions of 5.36 angstroms×5.36 angstroms and 5.34 angstroms×5.34 angstroms, respectively. Monoclinic perovskite 110 and tetragonal perovskite 120 tungsten trioxide have interstitial sites that are smaller and in some cases asymmetric, with dimensions from 3.08 angstroms to 4.47 angstroms, as shown in FIG. 1. Not to be limited by theory, in a material in which ions are to be repetitively intercalated and deintercalated, it is desirable to have an interstitial site that is sufficiently large to enable efficient ion mobility. Further, it is desirable to have an interstitial site that is sufficiently large such that repetitive ion removal and insertion does not result in significant lattice strain, furthermore, it is desirable to have a crystal structure that can tolerate repetitive ion removal and insertion without undergoing a structural phase transition. The structures shown in FIG. 1 can represent polymorphs of tungsten trioxide containing lithium (e.g., lithium tungsten oxide), where the lithium atoms are not shown in the structures. In these cases, the structures in FIG. 1 represent the framework of the lithium tungsten oxide crystals, without showing the positions of the lithium atoms in the structures.

In some embodiments, the lithium tungsten oxide thin films have a perovskite crystal structure with a space group P4/nmm, and lattice parameters of a=b=from approximately 5.2 angstroms to approximately 5.3 angstroms, and c=from approximately 3.8 angstroms to approximately 3.9 angstroms. In some embodiments, the lithium tungsten oxide thin films have Raman peaks at approximately 805 $cm^{-1}$, at approximately 950 $cm^{-1}$, at approximately 680-715 $cm^{-1}$, and at approximately 270 $cm^{-1}$.

In some embodiments, the lithium tungsten oxide thin films are cathodic electrochromic layers in multi-layer stacks, or in electrochromic devices. In some embodiments, the multi-layer stacks and electrochromic devices have desirable properties and characteristics. In some embodiments, electrochromic devices containing the lithium tungsten oxide cathodic electrochromic layer have an optical transmission at 550 nm of greater than 60%, or greater than 70% in the fully bleached state. In some embodiments, the change in capacity of the electrochromic device containing the lithium tungsten oxide cathodic electrochromic layer, from the initial measured capacity to the measured capacity after approximately 1000 cycles, may be between a loss of approximately −2 mC/cm$^2$ to a gain of approximately 4 mC/cm$^2$.

Figure 2:
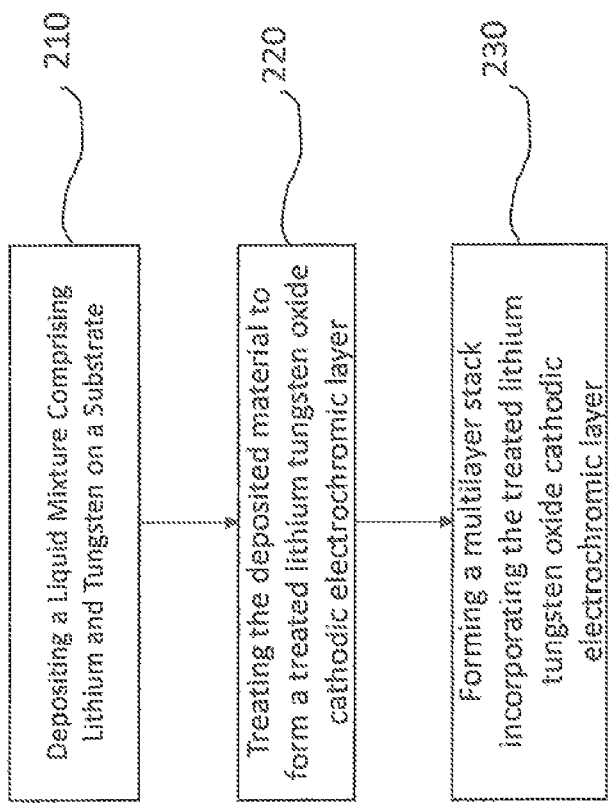
FIG. 2 is a flow chart showing an embodiment of the current invention for a method of forming a multilayer stack.

In some embodiments the cathodic films may be formed using a liquid deposition process as shown in the flow chart of FIG. 2. The liquid deposition process may be a sol-gel process. The process may include forming a liquid mixture comprising a liquid phase and a dispersed phase, depositing a film of a liquid mixture comprising lithium and tungsten onto a surface of a substrate, and treating the deposited material to form a treated lithium tungsten oxide cathodic electrochromic layer. In some embodiments, treating the deposited material comprises thermal treatment. In some embodiments, treating the film comprises hydrolyzing and calcining the deposited film. The film after treatment (e.g., after thermal treatment) may be referred to as the "as-deposited" film. The process may include depositing a cathodic electrochromic layer on a first substrate wherein the cathodic electrochromic layer comprises lithium and tungsten, and the atomic ratio of the amount of lithium to the amount of tungsten is greater than 0 and less than 1, or greater than 0 and less than 0.75, or greater than 0 and less than 0.5, or greater than 0 and less than 0.4, or greater than 0 and less than 0.35, or greater than 0 and less than 0.3, or greater than 0 and less than 0.25, or greater than 0 and less than 0.2, or greater than 0 and less than 0.15, or greater than 0 and less than 0.1, or greater than 0 and less than 0.05 when the cathodic electrochromic layer is in its fully bleached state.

In some embodiments, the lithium tungsten oxide film contains lithium in the fully bleached state (i.e., the state of the cathodic electrochromic material when the material is held at 3.4 V with respect to Li/Li$^+$ for a time period greater than or equal to 1 hour at 85° C. in an electrochemical half-cell in a propylene carbonate solution containing 1 M lithium perchlorate (under anhydrous conditions and in an Ar atmosphere)). In some embodiments, the cathodic electrochromic material is in a multi-layer stack, and/or an EC device, and the magnitude and duration of the applied potential that is required to achieve the fully bleached state, as defined above, may be influenced by the other layers in the multi-layer stack and/or EC device. In some embodiments, the maximum Tvis of the lithium tungsten oxide film is in the fully bleached state. In some embodiments, the lithium tungsten oxide film contains lithium and contains no mobile lithium in the fully bleached state. In some embodiments, no further lithium can be removed from the lithium tungsten oxide in the fully bleached state, without exceeding 5.0 V with respect to Li/Li$^+$, subject to the voltage stability window of the ion conductor and of the TCO material. In some embodiments, the lithium tungsten oxide film is in the electrochemically and optically matched (i.e., EOM) state with the anode material in the fully bleached state. In some embodiments, the lithium present in the lithium tungsten oxide film in the fully bleached state is provided during the synthesis of the lithium tungsten oxide film, and the lithium present in the lithium tungsten oxide film while the film is in a dark state or intermediate state (e.g., in a state where the optical transmission is lower than that in the fully bleached state) is provided by the other layers in the device (e.g., the ion conductor layer and/or the anode film) in addition to the lithium already present which has been provided during the synthesis of the lithium tungsten oxide film. In some embodiments, the reduction in optical transmission (compared to the fully bleached state) of the lithium tungsten oxide film is the result of transferring lithium from the other layers of the device to the lithium tungsten oxide cathode film, and not due to the lithium that is provided during the lithium tungsten oxide film synthesis. In some embodiments, the incorporation of lithium in the as-deposited film stabilizes a certain structure of the film. In some embodiments, the lithium tungsten oxide film with lithium in the fully bleached state has improved bleached state transmission, improved color, improved switching rate, improved ability to switch, and/or improved reversibility and durability compared with conventional tungsten oxide films without lithium in the as-deposited or fully bleached state, and/or compared with similar lithium tungsten oxide films where y=0 in the presence of a non-zero x.

For convenience, two optical states of electrochromic films or devices will be referred to as a bleached state and a darkened state in the present disclosure, but it should be understood that these are merely examples and relative terms (i.e., a first one of the two states is more transmissive or "more bleached" than the other state and the other of the two states is less transmissive or "more darkened" than the first state) and that there could be a set of bleached and darkened states between the most transmissive state and the least transmissive state that are attainable for a specific electrochromic device; for example, it is feasible to switch between intermediate bleached and darkened states in such a set.

In some embodiments, the lithium incorporated in the as-deposited lithium tungsten oxide films in the fully bleached state does not donate electrons to the tungsten atoms. In other words, the lithium incorporated in the as-deposited film does not convert W$^{6+}$ to W$^{5+}$ in the film. However, in an electrochromic device intercalation of additional lithium will donate electrons to the tungsten atoms, and will change their oxidation states, and will cause the film to switch from a bleached state to a darkened state.

In some embodiments, sol-gel prepared tungsten trioxide materials (including lithium tungsten oxide) have the "Perovskite Tungsten Bronze" [or PTB] structure. The PTB structure may be described as similar to the ReO$_3$ crystal structure with additional metal (M) ions (usually monovalent) intercalated into interstitial spaces of the ReO$_3$ structure resulting in M$_x$ReO$_3$ and the perovskite structure type. In some embodiments, M is Li or Na.

In some embodiments, the lithium tungsten oxide has a perovskite crystal structure, or a cubic perovskite crystal structure, or a tetragonal perovskite crystal structure, or an orthorhombic perovskite crystal structure, or a monoclinic perovskite crystal structure or a triclinic perovskite crystal structure.

Not to be limited by theory, in some embodiments, the lithium incorporated into the lattice can stabilize an unexpected crystal structure that has beneficial properties compared to tungsten oxide films without incorporated lithium. In some cases, this can be a cubic perovskite crystal structure, or a tetragonal perovskite crystal structure, or an orthorhombic perovskite crystal structure with a larger channel size than a monoclinic perovskite crystal structure typically observed in tungsten oxide films without incorporated lithium. It is well known in the literature that thermally evaporated films that have subsequently been crystallized by annealing show worse durability than the amorphous tungsten trioxide thermally evaporated films in electrochromic devices. Not to be limited by theory, in some cases the degraded durability can be attributed to smaller channels in the crystal structure. Not to be limited by theory, the cubic perovskite crystal structure, or a tetragonal perovskite crystal structure, or an orthorhombic perovskite crystal structure have larger open channels throughout compared to monoclinic perovskite, which are hypothesized to aid in the diffusion of mobile intercalated Li and the accommodation of the mobile intercalated Li ions without detrimental lattice strain and phase changes associated with poor electrochromic durability.

In some embodiments, the lithium tungsten oxide film further comprises at least one additional element. In some embodiments, the additional element(s) is/are selected from the elements commonly seen in a $2^+$ oxidation state (e.g., Ni, Co, Zn, Mg), or from elements commonly seen in a $3^+$ oxidation state, (e.g., Al), or from elements commonly seen in a $4^+$ oxidation state (e.g., Ge, Zr, Hf), or from elements commonly seen in a $5^+$ oxidation state (e.g., Nb, Sb, Ta), or from elements commonly seen in a $6^+$ oxidation state(e.g., Mo) and combinations thereof. In some embodiments, the additional element(s) is/are selected from the group consisting of Ni, Co, Zn, Mg, Al, Ge, Zr, Hf, Nb, Sb, Ta, Mo, and combinations thereof. In some embodiments, the lithium tungsten oxide film comprises at least one additional element from any of the above lists in a concentration equal to or less than about 10%.

A further aspect of the present disclosure is a multi-layer electrochromic structure comprising a first substrate and a second substrate, a first and a second electrically conductive layer, an anode layer, a cathodic electrochromic layer, and an ion conductor layer, wherein the first electrically conductive layer is between the first substrate and the cathodic electrochromic layer, the cathodic electrochromic layer is between the first electrically conductive layer and the ion conductor layer, the second electrically conductive layer is between the anode layer and the second substrate, the anode layer is between the second electrically conductive layer and the ion conductor layer, and the ion conductor layer is between the anode layer and cathodic electrochromic layer. The cathodic electrochromic layer can comprise lithium and tungsten, and the atomic ratio of the amount of lithium to the amount of tungsten is greater than 0 and less than 1, or greater than 0 and less than 0.75, or greater than 0 and less than 0.5, or greater than 0 and less than 0.4, or greater than 0 and less than 0.35, or greater than 0 and less than 0.3, or greater than 0 and less than 0.25, or greater than 0 and less than 0.2, or greater than 0 and less than 0.15, or greater than 0 and less than 0.1, or greater than 0 and less than 0.05 when the cathodic electrochromic layer is in its fully bleached state.

In accordance with one aspect of the present disclosure, cathodic electrochromic materials comprising lithium, tungsten, and in some cases at least one additional element are prepared from a liquid mixture comprising lithium, tungsten, and in some cases the additional element(s). The resulting cathodic electrochromic films have a range of desirable properties and characteristics. In another embodiment, the cathodic electrochromic material is provided in an electrochemically and optically matched (EOM) state relative to an anodic electrochromic material in its fully bleached state for use in an electrochromic device. In another embodiment, the cathodic electrochromic material is relatively stable; for example, the lithium tungsten oxide material does not darken from its fully bleached state or deactivate (e.g., remain transparent but no longer function as an electrochromic cathode material or film) at elevated temperatures in the presence of ambient air and sunlight.

In accordance with one aspect of the present disclosure, the relative amounts of lithium and tungsten in the electrochromic lithium tungsten oxide material are controlled such that an atomic ratio of the amount of lithium to the amount of tungsten in the electrochromic lithium tungsten oxide material is at least about 0.05:1, or at least about 0.1:1, or at least about 0.2:1, or at least about 0.3:1, or at least about 0.4:1, or at least about 0.5:1, or at least about 0.6:1, or at least about 0.7:1, or at least about 0.8:1, or at least about 0.9:1, or less than about 0.05:1, or less than about 0.1:1, or less than about 0.2:1, or less than about 0.3:1, or less than about 0.4:1, or less than about 0.5:1, or less than about 0.6:1, or less than about 0.7:1, or less than about 0.8:1, or less than about 0.9:1 or from 0.01:1 to 1:1, or from 0.05:1 to 1:1, or from 0.1:1 to 1:1, or from 0.01:1 to 0.75:1, or from 0.01:1 to 0.5:1, or from 0.01:1 to 0.4:1, or from 0.01:1 to 0.3:1, or from 0.01:1 to 0.2:1, respectively.

In accordance with one aspect of the present disclosure, the relative amounts of lithium, tungsten and additional element(s) in the electrochromic lithium tungsten oxide material are controlled such that an atomic ratio of the amount of lithium to the combined amount of tungsten and all additional element(s) in the electrochromic lithium tungsten oxide material is at least about 0.05:1, or at least about 0.1:1, or at least about 0.2:1, or at least about 0.3:1, or at least about 0.4:1, or at least about 0.5:1, or at least about 0.6:1, or at least about 0.7:1, or at least about 0.8:1, or at least about 0.9:1, or less than about 0.05:1, or less than about 0.1:1, or less than about 0.2:1, or less than about 0.3:1, or less than about 0.4:1, or less than about 0.5:1, or less than about 0.6:1, or less than about 0.7:1, or less than about 0.8:1, or less than about 0.9:1 or from 0.01:1 to 1:1, or from 0.05:1 to 1:1, or from 0.1:1 to 1:1, or from 0.01:1 to 0.75:1, or from 0.01:1 to 0.5:1, or from 0.01:1 to 0.4:1, or from 0.01:1 to 0.3:1, or from 0.01:1 to 0.2:1, respectively.

In some cases the cathodic lithium tungsten oxide has an operable electrical potential range versus lithium/lithium-ion that is less than or equal to approximately 3.0 Volts and greater than or equal to approximately 2.3 Volts. In one embodiment, the cathodic electrochromic lithium tungsten oxide material has a bleached state voltage that is at least 3.0 V, or at least 3.2 V, or at least 3.4 V, or at least 3.6 V.

Electrochromic Stacks and Devices

Figure 3:
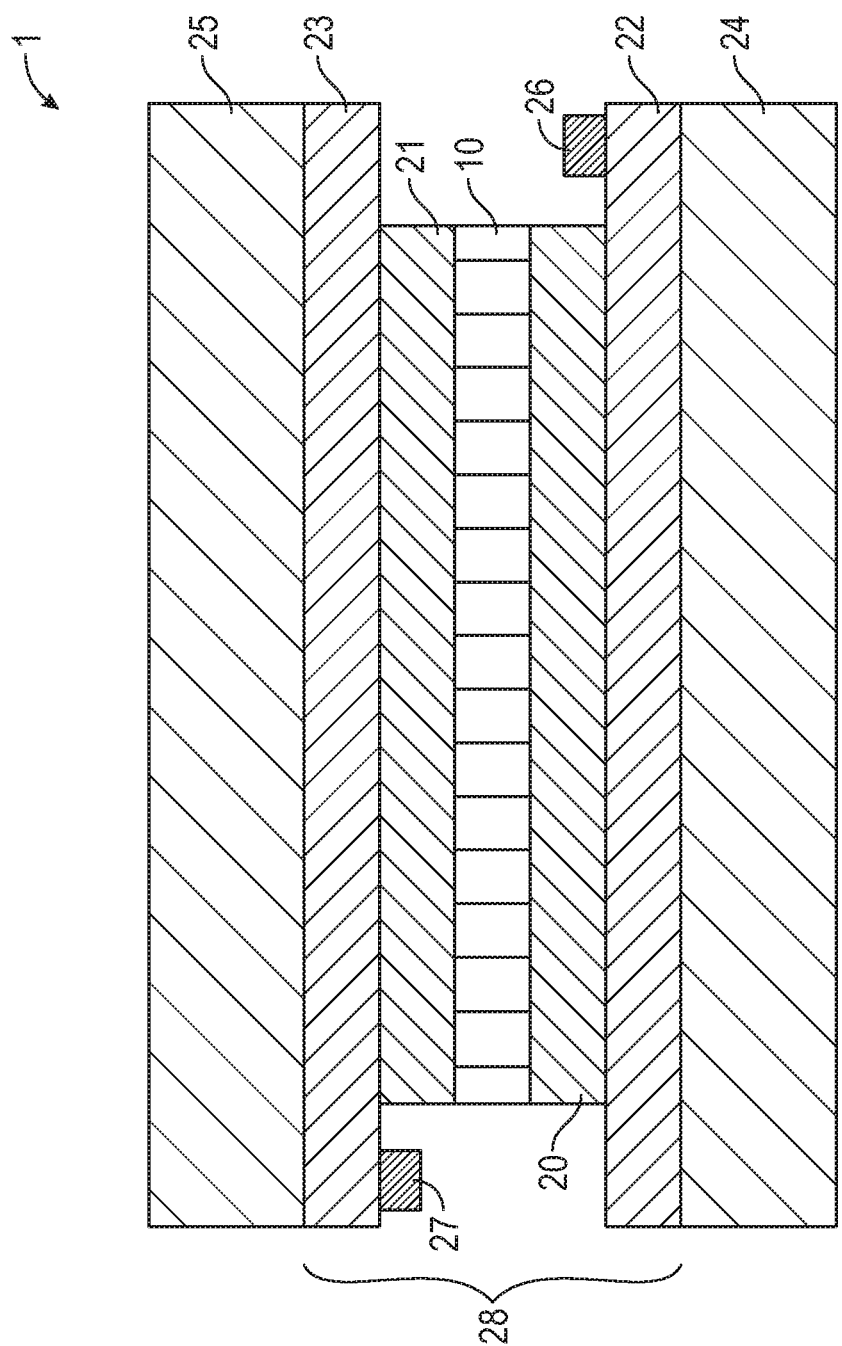
FIG. 3 is a schematic cross-section of a multi-layer electrochromic structure comprising a cathodic electrochromic layer of the present disclosure.

FIG. 3 depicts a cross-sectional structural diagram of an electrochromic structure 1 having a cathodic electrochromic layer comprising lithium and tungsten in accordance with one embodiment of the present disclosure. Moving outward from the center, electrochromic structure 1 comprises an ion conductor layer 10. Cathode layer 20 (a cathodic electrochromic layer comprising lithium and tungsten as described in greater detail elsewhere herein) is on one side of and in contact with a first surface of ion conductor layer 10. Anode layer 21 is on the other side of and in contact with a second surface of ion conductor layer 10. The central structure, that is, layers 20, 10, 21, is positioned between first and second electrically conductive layers 22 and 23 which, in turn, are arranged against outer substrates 24, 25. Elements 22, 20, 10, 21, and 23 are collectively referred to as an electrochromic stack 28.

Ion conductor layer 10 serves as a medium through which lithium ions are transported (in the manner of an electrolyte) when the electrochromic device transforms between the bleached state and the darkened state. Ion conductor layer 10 comprises an ion conductor material and may be transparent or non-transparent, colored or non-colored, depending on the application. Preferably, ion conductor layer 10 is highly conductive to lithium ions and has sufficiently low electron conductivity that negligible electron transfer takes place during normal operation.

Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI (lithium bis(trifluoromethane) sulfonimide), $LiBF_4$ (lithium tetrafluoroborate), $LiPF_6$ (lithium hexafluorophosphate), $LiAsF_6$ (lithium hexafluoroarsenate), $LiCF_3SO_3$ (lithium trifluoromethane sulfonate), $LiB(C_6F_5)_4$ (lithium perfluorotetraphenylboron) and $LiClO_4$ (lithium perchlorate). Additional examples of suitable ion conductor layers include silicates, tantalum oxides, niobium oxides, and borates. Silicon oxides include silicon-aluminum-oxide. These materials may be doped with different dopants, including lithium. Lithium doped silicon oxides include lithium silicon-aluminum-oxide. In some embodiments, the ion conductor layer comprises a silicate-based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conductor layer 10 will vary depending on the material. In some embodiments using an inorganic ion conductor, the ion conductor layer 10 is about 250 nm to 1 nm thick, preferably about 50 nm to 5 nm thick. In some embodiments using an organic ion conductor, the ion conductor layer is about 1000000 nm to 1000 nm thick or about 250000 nm to 10000 nm thick. The thickness of the ion conductor layer is also substantially uniform. In one embodiment, a substantially uniform ion conductor layer varies by not more than about +/−10% in each of the aforementioned thickness ranges. In another embodiment, a substantially uniform ion conductor layer varies by not more than about +/−5% in each of the aforementioned thickness ranges. In another embodiment, a substantially uniform ion conductor layer varies by not more than about +/−3% in each of the aforementioned thickness ranges.

Cathode layer 20 is an electrochromic layer comprising lithium, tungsten, and in some cases at least one additional element as described in greater detail elsewhere herein. In one embodiment, anode layer 21 is an electrochromic layer. For example, anode layer 21 may comprise an electrochromic oxide based on, for example, Ni, Ir, and Fe. The anodic electrochromic layer can be prepared by a number of deposition processes including vapor deposition processes, wet-coating processes, spray coating processes, dip coating, and electrodeposition. Many of these anodic electrochromic films are mixed metal oxides where lithium or protons are intercalated to balance charge during cycling. Additionally, non-oxide based films such as Prussian blue materials can be useful as anodic electrochromic films. In one embodiment, anodically coloring films include oxides and/or hydroxides based on nickel, iridium, iron, chromium, cobalt and/or rhodium. In an alternative embodiment, anode layer 21 is a non-electrochromic counter-electrode for cathode layer 20 such as cerium oxide. In yet another embodiment, anode layer 21 comprises anodes described in Kinestral patents U.S. Pat. Nos. 9,207,514, 9,256,111, and 9,395,593 and incorporated herein by reference.

The thickness of cathode layer 20 and anode layer 21 will depend upon the electrochromic material selected for the electrochromic layer and the application. In some embodiments, cathode layer 20 will have a thickness in the range of about 25 nm to about 2000 nm. For example, in one embodiment cathode layer 20 has a thickness of about 50 nm to about 2000 nm. By way of further example, in one embodiment cathode layer 20 has a thickness of about 25 nm to about 1000 nm. By way of further example, in one such embodiment, cathode layer 20 has an average thickness between about 100 nm and about 700 nm. In some embodiments, cathode layer 20 has a thickness of about 250 nm to about 500 nm. Anode layer 21 will typically have thicknesses in the same ranges as those stated for cathode layer 20. One of skill in the art will appreciate that certain relationships exist between the thickness of the cathode or anode layer, and the materials deposited to comprise the cathode or anode layer. For example, if the average thickness of the cathode or anode layer is between about 250 nm to about 500 nm, then cathode or anode precursor materials that comprise the liquid mixtures used to deposit the cathode or anode layers will likely be composed of species that are smaller than 250 nm to 500 nm.

In one embodiment, cathode layer 20 and anode layer 21 are in electrochemically and optically matched (EOM) states. For example, when the cathode lithium tungsten oxide film has a thickness of about 450 nm and an area charge capacity of 27 $mC/cm^2$, the anode may have a thickness of about 450 nm and a charge capacity of 27 $mC/cm^2$ over a cell voltage of about 1.5 V (where −0.9 V is the fully bleached state of both the anode and the cathode).

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 1 may be changed by applying a voltage pulse to electrically conductive layers 22 and 23. The pulse causes electrons and ions to move between cathode layer 20 and anode layer 21 and, as a result, the cathode layer 20 and, optionally, anode layer 21 change(s) optical states, thereby switching electrochromic structure 1 from a more transmissive state to a less transmissive state, or from a less transmissive state to a more transmissive state. In one embodiment, electrochromic structure 1 is transparent before the voltage pulse and less transmissive (e.g., more reflective or colored) after the voltage pulse or vice versa.

Referring again to FIG. 3, the power supply (not shown) connected to bus bars 26 and 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal-coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protective coating, a silica/silicone anti-abrasion coating, or the like, such as is well known in the plastic glazing art. Suitable glasses include either clear or tinted soda lime glass, chemically tempered soda lime glass, heat strengthened soda lime glass, tempered glass, or borosilicate glass. In some embodiments of electrochromic structure 1 with glass, e.g., soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

In one preferred embodiment of the disclosure, first substrate 24 and second substrate 25 are each float glass. In certain embodiments for architectural applications, this glass is at least 0.5 meters by 0.5 meters, and can be much larger, e.g., as large as about 3 meters by 4 meters. In such applications, this glass is typically at least about 2 mm thick and more commonly 4-6 mm thick.

Independent of application, the electrochromic structures of the present disclosure may have a wide range of sizes. In general, it is preferred that the electrochromic structure comprise a substrate having a surface with a surface area of at least 0.001 meter$^2$. For example, in certain embodiments, the electrochromic structure comprises a substrate having a surface with a surface area of at least 0.01 meter$^2$. By way of further example, in certain embodiments, the electrochromic structure comprises a substrate having a surface with a surface area of at least 0.1 meter$^2$. By way of further example, in certain embodiments, the electrochromic structure comprises a substrate having a surface with a surface area of at least 1 meter$^2$. By way of further example, in certain embodiments, the electrochromic structure comprises a substrate having a surface with a surface area of at least 5 meter$^2$. By way of further example, in certain embodiments, the electrochromic structure comprises a substrate having a surface with a surface area of at least 10 meter$^2$.

At least one of the two electrically conductive layers 22 and 23 is also preferably transparent in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22 and 23 are each transparent. In certain embodiments, one or both of the electrically conductive layers 22 and 23 is inorganic and/or solid. Electrically conductive layers 22 and 23 may be made from a number of different transparent materials, including transparent conductive oxides (i.e., TCOs), thin metallic coatings, networks of conductive nanoparticles (e.g., rods, tubes, dots) conductive metal nitrides, and composite conductors. TCOs include metal oxides and metal oxides doped with one or more metals. Examples of such TCOs (e.g., metal oxides and doped metal oxides) include indium oxide, indium tin oxide, doped indium oxide, tin oxide, doped tin oxide, fluorine doped tin oxide (FTO), zinc oxide, aluminum zinc oxide, doped zinc oxide, ruthenium oxide, doped ruthenium oxide and the like. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 μm or thinner). Non-exclusive examples of electron conductors 22 and 23 transparent to visible light are thin films of indium tin oxide (ITO), fluorine doped tin oxide (FTO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 3, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electrical connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5Ω/□. In general, it is desirable that the sheet resistance of each of the first and second electrically conductive layers 22 and 23 be about the same. In one embodiment, first and second electrically conductive layers 22 and 23 each have a sheet resistance of about 20Ω/□ to about 8Ω/□.

To facilitate more rapid switching of electrochromic structure 1 from a state of relatively greater transmittance to a state of relatively lesser transmittance, or vice versa, at least one of electrically conductive layers 22 and 23 may have a sheet resistance, $R_s$, to the flow of electrons through the layer that is non-uniform. For example, in one embodiment only one of first and second electrically conductive layers 22 and 23 has a non-uniform sheet resistance to the flow of electrons through the layer. Alternatively, first electrically conductive layer 22 and second electrically conductive layer 23 may each have a non-uniform sheet resistance to the flow of electrons through the respective layers. Without being bound by any particular theory, it is presently believed that spatially varying the sheet resistance of electrically conductive layer 22, spatially varying the sheet resistance of electrically conductive layer 23, or spatially varying the sheet resistance of electrically conductive layer 22 and electrically conductive layer 23 improves the switching performance of the device by controlling the voltage drop in the conductive layer to provide a uniform potential drop or a desired non-uniform potential drop across the device, over the area of the device.

Lithium Tungsten Oxide Electrochromic Properties

In some embodiments, lithium tungsten oxide films have transmission at 550 nm (i.e., T550) in the bleached state or in the fully bleached state greater than 70%, or greater than 75%, or greater than 80%, or greater than 85%, or greater than 90%, or greater than 95%, or from 70% to 99%, or from 70% to 95%, or from 70% to 90%. In some embodiments, lithium tungsten oxide films have a T550 in the dark state less than 20%, or less than 15%, or less than 10%, or less than 5%, or from 1% to 20%, or from 1% to 10%, or from 1% to 5%.

In some embodiments, lithium tungsten oxide films have a $T_{vis}$, calculated/obtained by integrating the transmission spectrum in the wavelength range of 380-780 nm using the spectral photopic efficiency $I_p(\lambda)$ (CIE, 1924) as a weighting factor, in the bleached state or in the fully bleached state greater than 70%, or greater than 75%, or greater than 80%, or greater than 85%, or greater than 90%, or greater than 95%, or from 70% to 99%, or from 70% to 95%, or from 70% to 90%. In some embodiments, lithium tungsten oxide films have a $T_{vis}$ in the dark state less than 20%, or less than 15%, or less than 10%, or less than 5%, or from 1% to 20%, or from 1% to 10%, or from 1% to 5%.

In some embodiments, the cathode of an electrochromic device comprises lithium tungsten oxide, and the device has a T550 in the bleached state or in the fully bleached state greater than 30%, or greater than 40%, or greater than 50%, or greater than 60%, or greater than 65%, or greater than 70%, or greater than 75%, or greater than 80%, or greater than 85%, or greater than 90%, or greater than 95%, or from 30% to 99%, or from 40% to 99%, or from 50% to 99%, or from 60% to 99%, or from 70% to 99%. In some embodiments, the cathode of an electrochromic device comprises lithium tungsten oxide, and the device has an initial T550, or a T550 after one cycle, or a T550 after 1001 cycles in the bleached state or in the fully bleached state greater than 30%, or greater than 40%, or greater than 50%, or greater than 60%, or greater than 65%, or greater than 70%, or greater than 75%, or greater than 80%, or greater than 85%, or greater than 90%, or greater than 95%, or from 30% to 99%, or from 40% to 99%, or from 50% to 99%, or from 60% to 99%, or from 70% to 99%. In some embodiments, the cathode of an electrochromic device comprises lithium tungsten oxide, and the device has a Tvis in the bleached state or in the fully bleached state greater than 30%, or greater than 40%, or greater than 50%, or greater than 60%, or greater than 65%, or greater than 70%, or greater than 75%, or greater than 80%, or greater than 85%, or greater than 90%, or greater than 95%, or from 30% to 99%, or from 40% to 99%, or from 50% to 99%, or from 60% to 99%, or from 70% to 99%. In some embodiments, the cathode of an electrochromic device comprises lithium tungsten oxide, and the device has an initial Tvis, or a Tvis after one cycle, or a Tvis after 1001 cycles in the bleached state or in the fully bleached state greater than 30%, or greater than 40%, or greater than 50%, or greater than 60%, or greater than 65%, or greater than 70%, or greater than 75%, or greater than 80%, or greater than 85%, or greater than 90%, or greater than 95%, or from 30% to 99%, or from 40% to 99%, or from 50% to 99%, or from 60% to 99%, or from 70% to 99%.

In some embodiments, lithium tungsten oxide films have an L*a*b* color (i.e., the CIE L*a*b* (CIELAB) color space specified by the International Commission on Illumination (in French, Commission Internationale de L'Eclairage)) in the bleached state or in the fully bleached state, where L* is from 90 to 100, or from 80 to 100, or from 70 to 100, a* is from −10 to 10, or from −5 to 5, or from −2 to 2, and b* is from −20 to 20, or from −15 to 15, or from −10 to 10, or from −20 to 10, or from 0 to 10, or from 0 to 20, or from −5 to 5, or from −2 to 2, or from −2 to 5, or from −5 to 2, or from −5 to 10, or from −10 to 5, or from −10 to 2, or from −2 to 10. In some embodiments, lithium tungsten oxide films have an L*a*b* color in the dark state, where L* is from 30 to 50, a* is from −10 to 10, and b* is from −60 to −30, or from −60 to −40, −50 to −30, or from −50 to −40. In some embodiments, lithium tungsten oxide films have an L*a*b* color (i.e., the CIE L*a*b* (CIELAB) color space specified by the International Commission on Illumination (in French, Commission Internationale de L'Eclairage)) in the bleached state or in the fully bleached state, where b* is from −20 to 20, or from −15 to 15, or from −10 to 10, or from −20 to 10, or from 0 to 10, or from 0 to 20, or from −5 to 5, or from −2 to 2, or from −2 to 5, or from −5 to 2, or from −5 to 10, or from −10 to 5, or from −10 to 2, or from −2 to 10. In some embodiments, lithium tungsten oxide films have an L*a*b* color in the dark state, where b* is from −60 to −30, or from −60 to −40, −50 to −30, or from −50 to −40.

In some embodiments, the cathode of an electrochromic device comprises lithium tungsten oxide, and the device has a charge capacity (Q) greater than 1 mC/cm$^2$, or greater than 2 mC/cm$^2$, or greater than 5 mC/cm$^2$, or greater than 10 mC/cm$^2$, or greater than 15 mC/cm$^2$, or greater than 20 mC/cm$^2$, or greater than 25 mC/cm$^2$, or greater than 30 mC/cm$^2$, or greater than 35 mC/cm$^2$, or greater than 40 mC/cm$^2$, or greater than 45 mC/cm$^2$, or greater than 50 mC/cm$^2$, or greater than 60 mC/cm$^2$, or greater than 80 mC/cm$^2$, or from 1 to 100 mC/cm$^2$, or from 10 to 100 mC/cm$^2$, or from 20 to 100 mC/cm$^2$, or from 20 to 60 mC/cm$^2$, or from 20 to 40 mC/cm$^2$.

In some embodiments, lithium tungsten oxide films have coloration efficiency, calculated from the ratio of the change in optical absorbance to the amount of charge density passed, greater than 10 cm$^2$/C, or greater than 20 cm$^2$/C, or greater than 30 cm$^2$/C, or greater than 40 cm$^2$/C, or greater than 50 cm$^2$/C, or greater than 60 cm$^2$/C, or from 10 cm$^2$/C to 100 cm$^2$/C, or from 20 cm$^2$/C to 100 cm$^2$/C, or from 30 cm$^2$/C to 100 cm$^2$/C, or from 10 cm$^2$/C to 70 cm$^2$/C, or from 20 cm$^2$/C to 70 cm$^2$/C, or from 30 cm$^2$/C to 70 cm$^2$/C.

Figure 4:
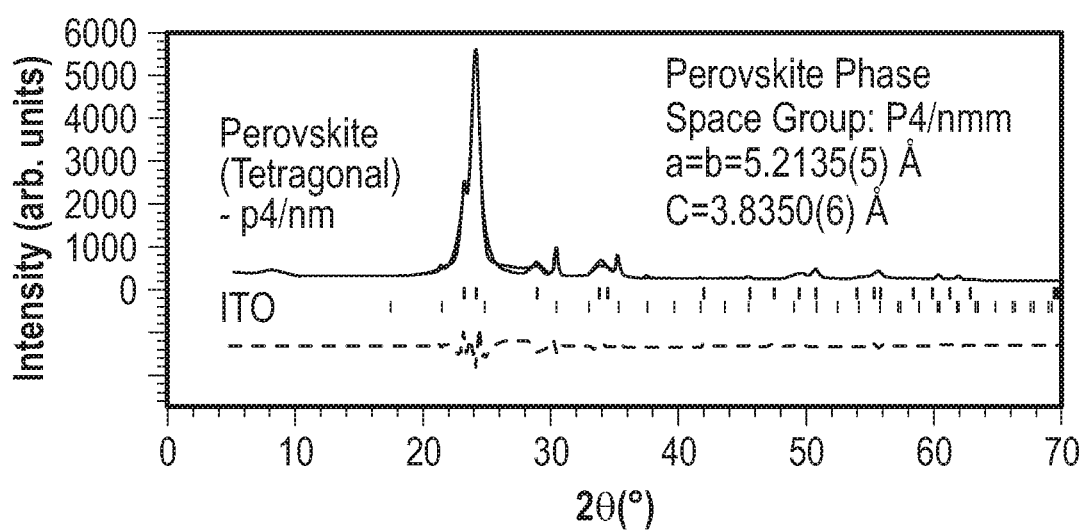
FIG. 4 shows an x-ray diffraction pattern of a tetragonal perovskite material.

FIG. 4 shows a representative x-ray diffraction (XRD) pattern of a lithium tungsten oxide film prepared using sol-gel processes. A lithium tungsten oxide electrochromic layer was prepared using the sol-gel processes described herein. A liquid mixture was coated on an ITO/glass substrate, the solvent is evaporated from the liquid mixture, and the film was heat treated to hydrolyze and calcine the film to form the lithium tungsten oxide electrochromic layer. The deposited lithium tungsten oxide cathodic electrochromic films were approximately 500 nm thick after deposition and treatment. The average thickness of the films was 475.3 nm, and the distribution of film thicknesses within 2 standard deviations of the mean was from 400.4 nm to 550.1 nm. The lithium to tungsten atomic ratio (i.e., the Li:W ratio) for the films prepared for the XRD of FIG. 4 are from 0.1 to 0.5 depending on the specific sol-gel process conditions. The XRD pattern (red dots) was collected using a diffractometer employing CuKα radiation (e.g., a Bruker D8 Advance diffractometer). The scan was made in Bragg-Brentano geometry using a Ni filter between 5-110° 2θ with a step size of 0.01°, and using a grazing incident diffraction (GID) geometry where θ was fixed at an incident angle of 0.5-5° while 2θ was scanned between 5-70°. The XRD pattern was fit (black line) with the perovskite structure (blue hash marks), space group P4/nmm with lattice parameters of a=5.2135(5) Å and c=3.8350(6) Å. Additional peaks in the pattern were matched to the ITO substrate (red hash marks).

X-ray diffraction (XRD) patterns can be analyzed using a diffractometer employing CuKα radiation (e.g., a Bruker D8 Advance diffractometer). Scans can be made in Bragg-Brentano geometry using a Ni filter between 5-110° 2θ with a step size of 0.01°. Scans may also be made using a grazing incident diffraction (GID) geometry where θ was fixed at an incident angle of 0.5-5° while 2θ was scanned between 5-70°. In some embodiments, lithium tungsten oxide films have XRD patterns which match that of a structure with corner sharing $WO_6$ octahedrons, commonly known as the perovskite structure. In some embodiments the XRD pattern can be fit (modeled) to a perovskite structure with cubic symmetry, using (for example, but not limited to) space groups Pm3m, Pm3(bar)m, or Fm3m (cubic perovskites). In some embodiments the XRD pattern can be fit (modeled) to a perovskite structure with tetragonal symmetry, using (for example, but not limited to) space groups P4/nmm, I4/mcm, I4(bar)c2, or I4 cm (tetragonal perovskites). In some embodiments the XRD pattern can be fit (modeled) to a perovskite structure with orthorhombic symmetry, using (for example, but not limited to) space groups Pnma, Pbcn or Pnnn (orthorhombic perovskites). In some embodiments the XRD pattern can be fit (modeled) to a perovskite structure with monoclinic symmetry, using (for example, but not limited to) space groups or I2/m, or $P2_1/n$ (monoclinic perovskites). In some embodiments, the XRD patterns can be fit to a perovskite structure with cubic symmetry, where the lattice parameters are a=b=c=from approximately 3.7 angstroms to approximately 3.8 angstroms. In some embodiments, the XRD patterns can be fit to a perovskite structure with tetragonal symmetry, where the lattice parameters are a=b=from approximately 5.2 angstroms to approximately 5.3 angstroms, and c=from approximately 3.8 angstroms to approximately 3.9 angstroms. In some embodiments, the XRD patterns can be fit to a perovskite structure with orthorhombic symmetry, where the lattice parameters are a=from approximately 7.3 angstroms to approximately 7.4 angstroms b=from approximately 7.5 angstroms to approximately 7.6 angstroms, and c=from approximately 7.7 angstroms to approximately 7.8 angstroms. In some embodiments, the XRD patterns can be fit to a perovskite structure with monoclinic symmetry, where the lattice parameters are a=from approximately 7.2 angstroms to approximately 7.3 angstroms b=from approximately 7.5 angstroms to approximately 7.6 angstroms, and c=from approximately 7.6 angstroms to approximately 7.7 angstroms, and angle β=from approximately 89° to 91°. In the above mentioned examples the modeled crystal lattices have nearest neighbor tungsten-tungsten distances between approximately 3.7 angstroms to approximately 3.9 angstroms. In the above mentioned examples the modeled crystal lattices have nearest neighbor tungsten-oxygen distances between approximately 1.7 angstroms to approximately 2.2 angstroms. In the above mentioned examples the modeled perovskite crystal lattices with tetragonal symmetry have nearest neighbor tungsten-oxygen distances between approximately 1.8 angstroms to approximately 1.9 angstroms.

Figure 5:
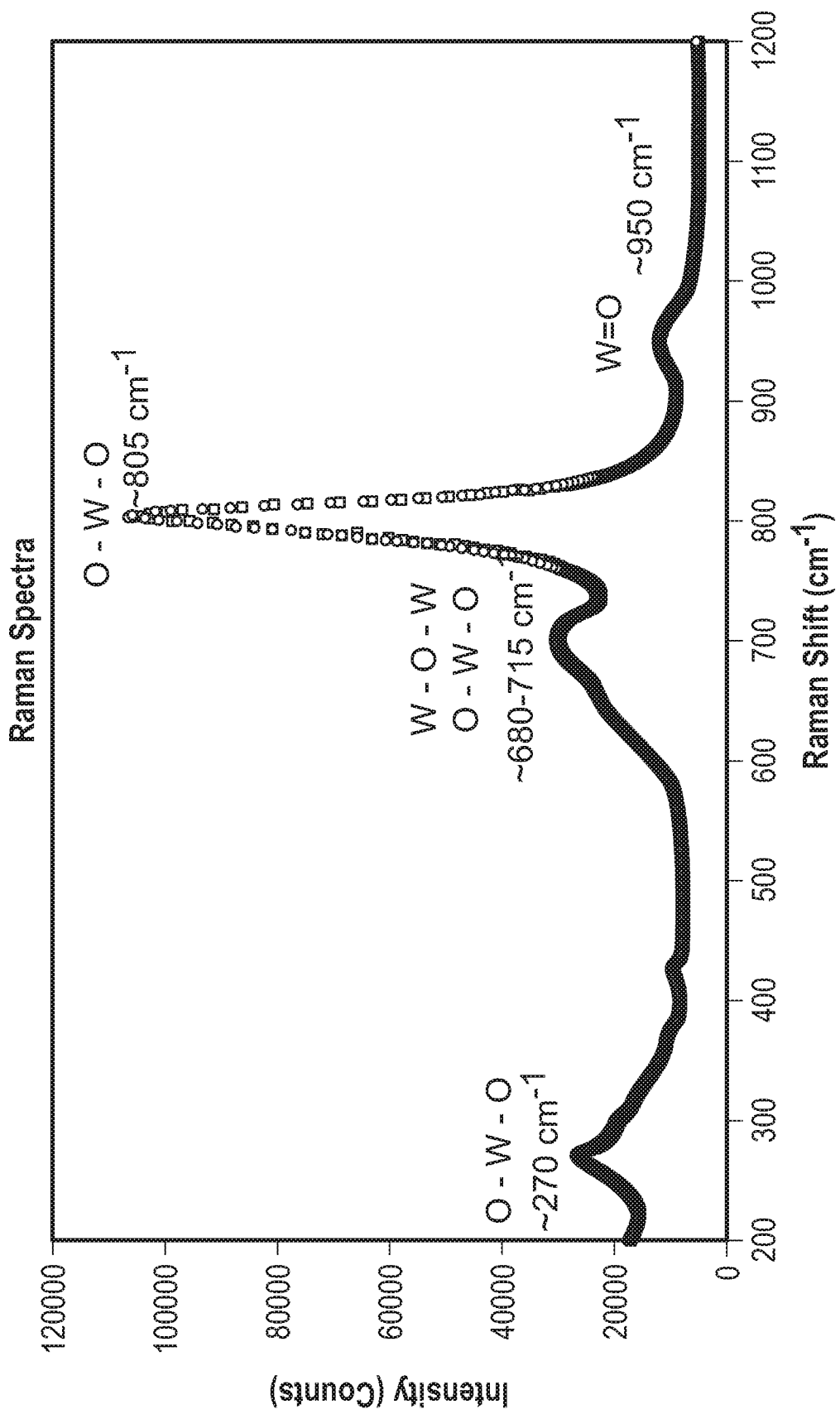
FIG. 5 shows Raman spectra from an example of the disclosure.

FIG. 5 shows example Raman spectra of lithium tungsten oxide films prepared using sol-gel processes, with the same details as the sample used to obtain the XRD pattern of FIG. 4. Theses Raman spectra have peaks at approximately 270 $cm^{-1}$, 680 $cm^{-1}$ to 715 $cm^{-1}$, and 805 $cm^{-1}$ corresponding to O—W—O bond modes, a peak at approximately 680 $cm^{-1}$ to 715 $cm^{-1}$ corresponding to W—O—W bond modes, and a peak at approximately 950 $cm^{-1}$ corresponding to W=O bond modes.

Raman spectra can provide information about crystal structure, and the types of bonds that exist in cathodic electrochromic layers, such as lithium tungsten oxides. In some cases, with an excitation source of 532 nm, the Raman spectrum of a lithium tungsten oxide film has peaks at approximately 270 $cm^{-1}$, from approximately 680 $cm^{-1}$ to 715 $cm^{-1}$, and at approximately 805 $cm^{-1}$, and in some cases these peaks correspond to O—W—O bond modes. In some cases, with an excitation source of 532 nm, the Raman spectrum of a lithium tungsten oxide film has a peak at from approximately 680 $cm^{-1}$ to 715 $cm^{-1}$, and in some cases, this peak corresponds to W—O—W bond modes. In some cases, with an excitation source of 532 nm, the Raman spectrum of a lithium tungsten oxide film has a peak at approximately 950 $cm^{-1}$, and in some cases this peak corresponds to W=O bond modes.

In some embodiments, the cathode of an electrochromic device comprises lithium tungsten oxide, and the device has a switching rate, the percent change (i.e., negative indicates loss) of the charge capacity when the constant current was applied for the materials to switch within 2 minutes, greater than −35, or greater than −30, or greater than −25, or greater than −20, or greater than −15, or greater than −10, or from −5 to −40, or from −5 to −35, or from −5 to −30, or from −10 to −30, or from −2 to 0, or from −1 to 0, or from −0.5 to 0. In some embodiments, the cathode of an electrochromic device comprises lithium tungsten oxide, and the device has an "ability to switch", greater than 40%, or greater than 50%, or greater than 60%, or greater than 70%, or greater than 80%, or greater than 90%, or from 40% to about 99%, or from 40% to 90%, or from 50% to about 99%, or from 50% to 90%, or from 60% to about 99%, or from 60% to 90%.

In some embodiments, the cathode of an electrochromic device comprises lithium tungsten oxide, and the device has a % fade (percent change in capacity between cycle 2 and cycle 23) less than 20%, or less than 15%, or less than 10%, or less than 5%, or less than 1%, or from 0.01% to 20%, or from 0.01% to 15%, or from 0.01% to 10%, or from 0.01% to 5%, or from 0.01% to 1%.

In some embodiments, the cathode of an electrochromic device comprises lithium tungsten oxide, and the device has a change in capacity from the initial measured capacity to the measured capacity after approximately 1000 cycles. In some embodiments, the difference in device charge capacity is measured between a first cycle and a $1001^{st}$ cycle, after the device has been cycled from a bleached state to a darkened state and back to the bleached state 1000 times, at 85° C., and exposed to illumination approximating the solar spectrum with an intensity of approximately 1000 $W/m^2$. In some embodiments, the change in capacity from the initial measured capacity (or the capacity measured after the $1^{st}$ cycle is complete) to the measured capacity after approximately 1000 cycles may be between a loss of approximately 1.32 to a gain of approximately 3.99 mC/cm$^2$, or between a loss of approximately 1.09 mC/cm$^2$ to a gain of approximately 2.11 mC/cm$^2$, or between a loss of approximately 7 to a gain of approximately 7 mC/cm$^2$, or from a loss of 5 to a gain of 5 mC/cm$^2$, or from a loss of 4 to a gain of 4 mC/cm$^2$, or from a loss of 3 to a gain of 3 mC/cm$^2$, or from a loss of 2 to a gain of 2 mC/cm$^2$, or from a loss of 2 to a gain of 4 mC/cm$^2$, or from a loss of 2 to a gain of 5 mC/cm$^2$, or from a loss of 2 to a gain of 7 mC/cm$^2$. In some embodiments, the change in capacity from the initial measured capacity (or the capacity measured after the $1^{st}$ cycle is complete) to the measured capacity after approximately 1000 cycles may be between −5% and 5%, or between −4% and 4%, or between −3% and 3%, or between −2% and 2%, or between −1% and 1%, or be approximately −5%, or be approximately −4%, or be approximately −3%, or be approximately −2%, or be approximately −1%. In some embodiments, the initial measured capacity (or the capacity measured after the $1^{st}$ cycle is complete) is greater than 1 mC/cm$^2$, or greater than 2 mC/cm$^2$, or greater than 5 mC/cm$^2$, or greater than 10 mC/cm$^2$, or greater than 15 mC/cm$^2$, or greater than 20 mC/cm$^2$, or greater than 25 mC/cm$^2$, or greater than 30 mC/cm$^2$, or greater than 35 mC/cm$^2$, or greater than 40 mC/cm$^2$, or greater than 45 mC/cm$^2$, or greater than 50 mC/cm$^2$, or greater than 60 mC/cm$^2$, or greater than 80 mC/cm$^2$, or from 1 to 100 mC/cm$^2$, or from 10 to 100 mC/cm$^2$, or from 20 to 100 mC/cm$^2$, or from 20 to 60 mC/cm$^2$, or from 20 to 40 mC/cm$^2$ and the change in capacity from the initial measured capacity (or to the capacity measured after the $1^{st}$ cycle is complete) to the measured capacity after approximately 1000 cycles may be between a loss of approximately 1.32 to a gain of approximately 3.99 mC/cm$^2$, or between a loss of approximately 7 to a gain of approximately 7 mC/cm$^2$, or from a loss of 5 to a gain of 5 mC/cm$^2$, or from a loss of 4 to a gain of 4 mC/cm$^2$, or from a loss of 3 to a gain of 3 mC/cm$^2$, or from a loss of 2 to a gain of 2 mC/cm$^2$, or from a loss of 2 to a gain of 4 mC/cm$^2$, or from a loss of 2 to a gain of 5 mC/cm$^2$, or from a loss of 2 to a gain of 7 mC/cm$^2$.

In some embodiments, the cathode of an electrochromic device comprises lithium tungsten oxide, and the device has a change in device b* in the bleached state from the initial measured device b* to the measured device b* after approximately 1000 cycles. In some embodiments, the difference in device b* is measured between a first cycle and a $1001^{st}$ cycle, after the device has been cycled from a bleached state to a darkened state and back to the bleached state 1000 times, at 85° C., and exposed to illumination approximating the solar spectrum with an intensity of approximately 1000 W/m$^2$. In some embodiments, the change in device b* from the initial measured device b* to the measured device b* after approximately 1000 cycles may be between approximately −5.52 to 0.38, or between approximately −3.33 to 0.71, or between approximately −10 to 10, or between approximately −10 to 5, or between approximately −10 to 2, or between approximately −10 to 1, or between approximately −5 to 10, or between approximately −2 to 10, or between approximately −1 to 10, or between approximately −5 to 5, or between approximately −3.5 to 3.5, or between approximately −5 to 2, or between approximately −5 to 1, or between approximately −3.5 to 1, or between approximately −2 to 2, or between approximately −1 to 1. In some embodiments, the initial device b* in the fully bleached state is from −20 to 20, or from −15 to 15, or from −10 to 10, or from −20 to 10, or from 0 to 10, or from 0 to 20, or from −5 to 5, or from −2 to 2, or from −2 to 5, or from −5 to 2, or from −5 to 10, or from −10 to 5, or from −10 to 2, or from −2 to 10, and the change in device b* from the initial measured device b* to the measured device b* in the fully bleached state after approximately 1000 cycles may be between approximately −5.52 to 0.38, or between approximately −10 to 10, or between approximately −10 to 5, or between approximately −10 to 2, or between approximately −10 to 1, or between approximately −5 to 10, or between approximately −2 to 10, or between approximately −1 to 10, or between approximately −5 to 5, or between approximately −5 to 2, or between approximately −5 to 1, or between approximately −2 to 2, or between approximately −1 to 1.

In some embodiments, the cathode of an electrochromic device comprises lithium tungsten oxide, and the device has a change in device Tvis in the bleached state from the initial measured device Tvis to the measured device Tvis after approximately 1000 cycles. In some embodiments, the difference in device Tvis is measured between a first cycle and a $1001^{st}$ cycle, after the device has been cycled from a bleached state to a darkened state and back to the bleached state 1000 times, at 85° C., and exposed to illumination approximating the solar spectrum with an intensity of approximately 1000 W/m$^2$. In some embodiments, the cathode of an electrochromic device comprises lithium tungsten oxide, and the device has a change in device Tvis in the bleached state from the initial measured device Tvis to the measured device Tvis after approximately 1000 cycles from between −17.93% to −6.04%, or from between −20.55% to −4.50%, or from between −30% to 0%, or from between −20% to 0%, or from between −10% to 0%, or from between −5% to 0%, or from between −30% to −5%, or from between −30% to −10%, or from between −20% to −5%, or from between −20% to −10%, or from between −15% to 0%, or from between −15% to −5%, or from between −15% to −10%. In some embodiments, the cathode of an electrochromic device comprises lithium tungsten oxide, and the device has an initial Tvis greater than 30%, or greater than 40%, or greater than 50%, or greater than 60%, or greater than 65%, or greater than 70%, or greater than 75%, or greater than 80%, or greater than 85%, or greater than 90%, or greater than 95%, or from 30% to 99%, or from 40% to 99%, or from 50% to 99%, or from 60% to 99%, or from 70% to 99% in the fully bleached state, and the change in device Tvis in the bleached state from the initial measured device Tvis to the measured device Tvis after approximately 1000 cycles from between −17.93% to −6.04%, or from between −30% to 0%, or from between −20% to 0%, or from between −10% to 0%, or from between −5% to 0%, or from between −30% to −5%, or from between −30% to −10%, or from between −20% to −5%, or from between −20% to −10%, or from between −15% to 0%, or from between −15% to −5%, or from between −15% to −10%.

Lithium Tungsten Oxide Electrochromic Layer Preparation Methods

In accordance with one aspect of the present disclosure, lithium tungsten oxide electrochromic layers may be prepared from the liquid mixtures in a series of steps. In general, a film is formed from the liquid mixture on a substrate, solvent is evaporated from the liquid mixture, and the film is treated to form the lithium tungsten oxide electrochromic layer. In one such embodiment, the film is thermally treated to form the lithium tungsten oxide electrochromic layer. In some embodiments, the film is hydrolyzed and calcined to form the lithium tungsten oxide electrochromic layer. In some embodiments, a film is formed from the liquid mixture on a substrate, and the solvent is evaporated from the liquid mixture and the film is treated to form the lithium tungsten oxide electrochromic layer simultaneously.

In one embodiment, the liquid mixture may be deposited onto any substrate having suitable optical, electrical, thermal, and mechanical properties. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protective coating, a silica/silicone anti-abrasion coating, or the like, such as is well known in the plastic glazing art. Suitable glasses include either clear or tinted soda lime glass, chemically tempered soda lime glass, heat strengthened soda lime glass, tempered glass, or borosilicate glass.

In one embodiment, the substrate comprises a transparent conductive layer (as described in connection with FIG. 1) on glass, plastic, metal, and metal-coated glass or plastic. In this embodiment, the liquid mixture may be deposited directly onto the surface of the transparent conductive layer. Some examples of the transparent conductive layer materials are described herein.

In another embodiment, the substrate comprises an ion conductor layer (as described in connection with FIG. 3) on glass, plastic, metal, and metal coated glass or plastic. In this embodiment, the liquid mixture may be deposited directly onto the surface of the ion conductor layer.

A range of techniques may be used to form a layer that is derived from the liquid mixture on the substrate. Any liquid coating method can be used. For example, a continuous liquid layer of the liquid mixture can be applied to the substrate by meniscus coating, roll coating, dip coating, spin coating, screen printing, spray coating, ink jet coating, knife over roll coating (gap coating), metering rod coating, curtain coating, air knife coating, and partial immersion coating and like, and solvent is then removed. Alternatively, the layer may be formed by directing droplets of the liquid mixture toward the substrate by spray or ink jet coating, and removing solvent. Regardless of technique, a layer is formed on the substrate containing lithium, tungsten, and in some cases at least one additional element in the ratios described herein in connection with the electrochromic cathodic layers.

In some embodiments, it may be desirable to form the lithium tungsten oxide layer on the substrate in a controlled atmosphere. For example, the relative humidity of the atmosphere can be controlled. In some embodiments, however, the control of relative humidity may be less important if appropriate amounts of water are added in an appropriate manner directly to the liquid mixture, for example if added to induce a preferred degree (full or partial) of hydrolysis.

The deposition of the liquid mixture onto the substrate may be carried out in a range of atmospheres. In one embodiment, the liquid mixture is deposited in an inert atmosphere (e.g., nitrogen or argon). In an alternative embodiment, the liquid mixture is deposited in an oxygen-containing atmosphere such as compressed dry air or synthetic air (consisting of a mixture of oxygen and nitrogen in approximately 20:80 v/v ratio). In some embodiments, the concentration of oxygen or $CO_2$ in the atmosphere can be controlled.

The temperature at which the liquid mixture is deposited onto the substrate may range from near room temperature to elevated temperatures. For spray coating, for example, the maximum high temperature would be limited by the substrate stability (e.g., 550 to 700° C. for glass, less than 250° C. for most plastics, etc.) and the desired annealing temperature for the layer. For coating techniques in which a continuous liquid film is applied to a substrate, for example, coating temperatures will typically be in range of room temperature 25° C. to about 80° C.

After the substrate is coated with the liquid mixture, the resulting films may be placed under an air stream, vacuum, or heated to achieve further drying in order to remove residual solvent. The composition of the ambient atmosphere for this step may be controlled as previously described in connection with the coating step.

In some embodiments, the coated substrate (i.e., the deposited film, the TCO, and the substrate) is subjected to a heat treatment to form the cathodic electrochromic layer. In some embodiments, the deposited film is hydrolyzed and calcined to form the lithium tungsten oxide electrochromic film. Depending upon the composition of the liquid mixture, and the TCO and the substrate stability, the coated substrate can be heat treated at a temperature from about 200° C. to about 750° C. For example, in one embodiment the coated substrate may be annealed at a temperature at the lower end of this range, e.g., at least about 250° C. but less than about 700° C. Lower temperatures within this range would be particularly advantageous for polymeric substrates that may lose dimensional stability at greater temperatures. In other embodiments, the coated substrate may be annealed at a temperature in the range about 300° C. to about 650° C. By way of further example, in one such embodiment the coated substrate may be annealed at a temperature in the range of about 350° C. to about 500° C. In general, however, annealing temperatures will typically not exceed about 750° C. The anneal time may range from several minutes (e.g., about 5 minutes) to several hours, or from about 1 minute to about 5 hours, or from about 1 minute to about 1 hour. The targeted lithium tungsten oxide material, composition, structure and morphology, in addition to the TCO and the substrate, must be considered when choosing the process conditions (e.g., temperature, atmosphere, time and order of process steps).

In some embodiments it may be desirable to heat-treat the coated substrate in a controlled atmosphere. In some embodiments, the relative humidity, oxygen concentration and/or $CO_2$ concentration of the atmosphere can be controlled.

The coated substrate may be heat-treated (i.e., subjected to heat treatment) by various means. In one embodiment, the coated substrate is heat-treated in a rapid thermal annealer in which heating occurs primarily through absorption of radiative energy by the layer and/or the substrate. In another embodiment, the coated substrate is heat-treated in a belt furnace in which heating occurs in one or more zones in a continuous process. In another embodiment, the coated substrate is heat-treated in a convection oven and furnaces in which heating is achieved in a batch process by a combination of radiative and conductive processes. In another embodiment, the coated substrate is heat-treated using a hot plate (bake plate) or surface heating where heating occurs primarily by conduction by placing the substrate on or slightly above a heated surface; examples include proximity baking where the sample is held above a plate using a cushion of air, hard contact baking where the substrate is held to the surface of a heated surface via vacuum or some other method, and soft contact baking where the substrate rests on a heated surface via gravity alone.

A further aspect of the present disclosure is a process for forming a lithium tungsten oxide film in a multi-layer electrochromic structure. In some embodiments, the process comprises coating a liquid mixture onto a surface of a substrate, and heat treating the deposited film to form a cathodic electrochromic layer, the liquid mixture comprising a continuous phase and a dispersed phase, the dispersed phase comprising metal oxide particles, metal hydroxide particles, metal alkoxide particles, metal alkoxide oligomers, gels or particles, or a combination thereof having a number average size of at least 5 nm. In some embodiments, the particles in the dispersed phase are larger than atomic dimensions but small enough to exhibit Brownian motion. In some embodiments, the particles in the dispersed phase are from about 10 angstroms to about 10 micrometers in length, where length refers to a diameter for roughly spherical particles, an average length for disk shaped particles, or a minimum or maximum or average dimension for irregularly shaped particles. In some embodiments, the particles may be considered colloids.

In some embodiments, the lithium tungsten oxide films are deposited by a sol-gel process, and the liquid mixture precursors may be comprised of metal alkoxides and water. In this case, the precursors will undergo a series of reactions when mixed that may be described as hydrolysis and condensation. These reactions occur through nucleophilic substitution ($S_N$) mechanisms involving nucleophilic addition ($A_N$) followed by proton transfer from the added molecule to a ligand with subsequent removal of the protonated species as either an alcohol (alcoxolation) or as water (oxolation). Under certain circumstances, olation is also a viable reaction pathway. In such a series of reactions, the addition of water to a metal alkoxide results in the generation of a metal hydroxide species plus an alcohol from the original alkoxide ligand and a proton from water. This metal hydroxide species may further react with metal alkoxides or other similarly generated metal hydroxides producing additional alcohol molecules or water, respectively, and metal-oxo-metal species. In the case of the olation reaction, the original metal hydroxide species may also react with water or alcohol to form metal-hydroxo-metal linkages releasing water and alcohol respectively. If one propagates these reactions in three dimensions to generate coordinatively saturated metal centers, M-O-M lattices are the result, i.e. metal oxides. In the case of olation, metal hydroxides are the product. [Brinker, C. J.; G. W. Scherer (1990). Sol-Gel Science: The Physics and Chemistry of Sol-Gel Processing. Academic Press. ISBN 0-12-134970-5.]

In some embodiments, the liquid mixture is prepared by combining, in a solvent system, a source of lithium, tungsten, and in some cases at least one additional element. In general, the source (starting) materials for each of the lithium, tungsten and/or additional element composition(s) comprised by the liquid mixture are soluble or dispersible in the liquid mixture solvent system and provide a source of metal(s) or metal oxide(s) for the lithium tungsten oxide film. Additionally, at least one of lithium, tungsten and/or additional element source (starting) materials is a hydrolysable species capable of polycondensation.

Depending upon the method of deposition and the solvent system comprised by the liquid mixture, the resulting electrochromic lithium tungsten oxide layer may comprise an appreciable amount of carbon. For example, in one embodiment, the lithium tungsten oxide cathodic electrochromic layer contains at least about 0.01 wt % carbon, or at least about 0.05 wt % carbon, or at least about 0.1 wt % carbon, or at least about 0.25 wt % carbon, or at least about 0.5 wt % carbon. Typically, however, the lithium tungsten oxide cathodic electrochromic material will generally contain no more than about 5 wt % carbon. Thus, for example, in one embodiment, the cathodic electrochromic material will contain less than 4 wt % carbon, or less than 3 wt % carbon, or less than 2 wt % carbon, or less than 1 wt % carbon, or from 0.01 wt % to 5 wt % carbon, or from 0.05 wt % to 2.5 wt % carbon, or from 0.1 wt % to 2 wt % carbon, or from 0.5 wt % to 1 wt % carbon.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1: Lithium Tungsten Oxide Electrochromic Half-Cells

Thin film lithium tungsten oxide samples on ITO/glass substrates were prepared according to the sol-gel processes described above. The films in this Example were coated onto roughly 15 cm×15 cm pieces of ITO coated glass, and then cut into roughly 1.5 cm×1.5 cm pieces for testing. The electrochemical and electrochromic properties of these films were examined in an argon environment in a combined electrochemical/optical setup consisting of a three electrode cell in a cuvette placed in the path of a white light source and spectrometer. Data were obtained by sequential oxidation and reduction under galvanostatic control followed by a constant voltage hold (CC-CV). The electrolyte was 1 M LiTFSI in propylene carbonate. Typically voltage ranges of 2.0-4.0, 2.0-4.1 or 2.0-4.2 V vs Li/Li$^+$ were applied. In this Example, 2.3 V is associated with the cathode reducing and switching from a more transmissive state to a less transmissive state, and 3.4 V is associated with the cathode oxidizing and switching from a less transmissive state to a more transmissive state. Separate pieces of lithium metal were used as the reference and counter electrodes. Optical data were recorded every 1-5 s. Coloration efficiency (CE) was calculated from the transmission data (at 550 nm) and the amount of charge passed during the first reduction event of the film over the applied voltage range.

Figure 6A:
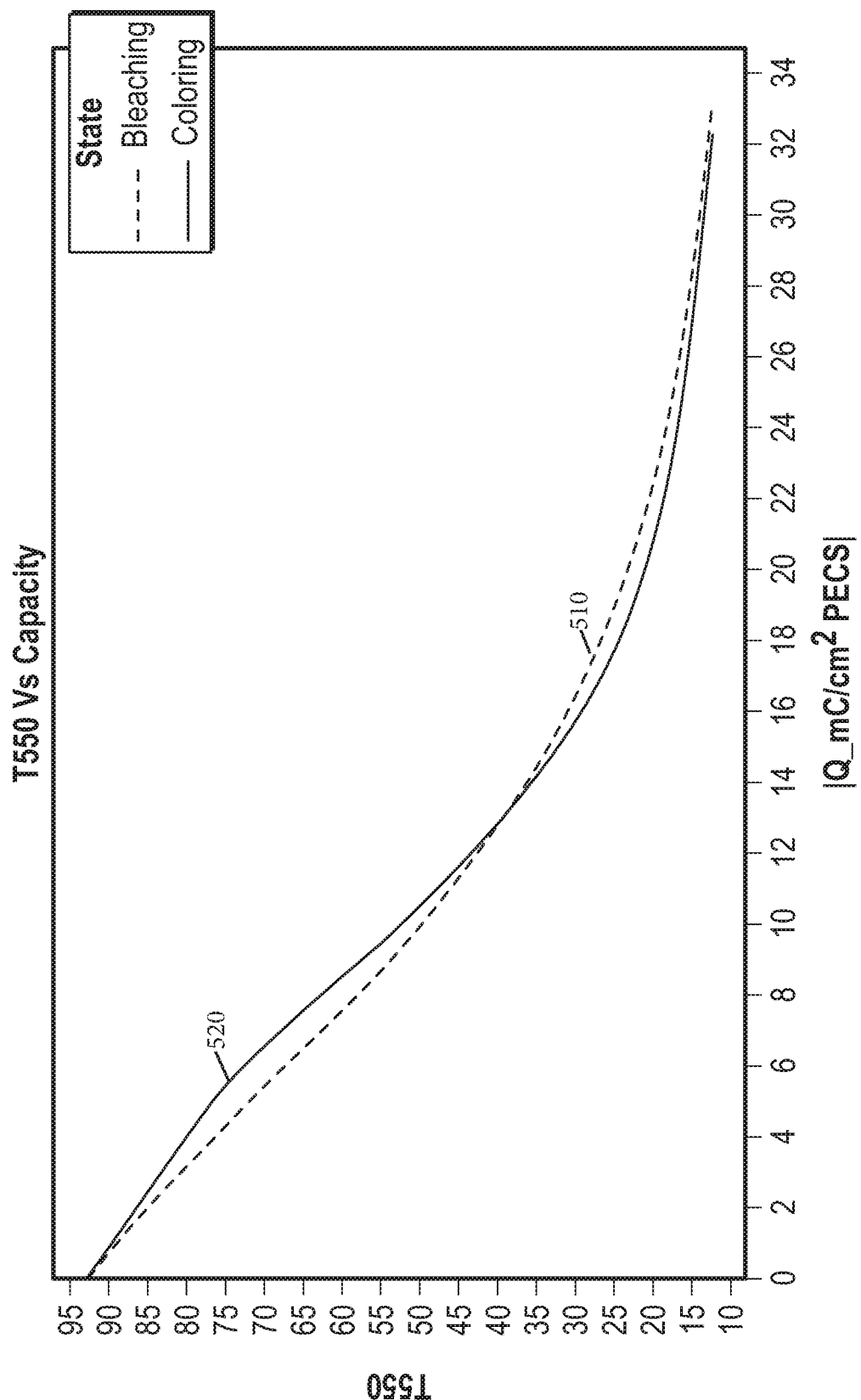
FIG. 6a shows T550 vs capacity of lithium tungsten oxide films as prepared according to one embodiment of the present disclosure.

FIG. 6A shows T550 versus capacity for lithium tungsten oxide films in this Example for a bleaching cycle 510, and a coloring cycle 520. In the bleached state, this film had a T550 of approximately 92.9%, and in the darkened state (after approximately 32.2 mC/cm$^2$ of additional charge) this film had a T550 of approximately 12.4%.

Figure 6B:
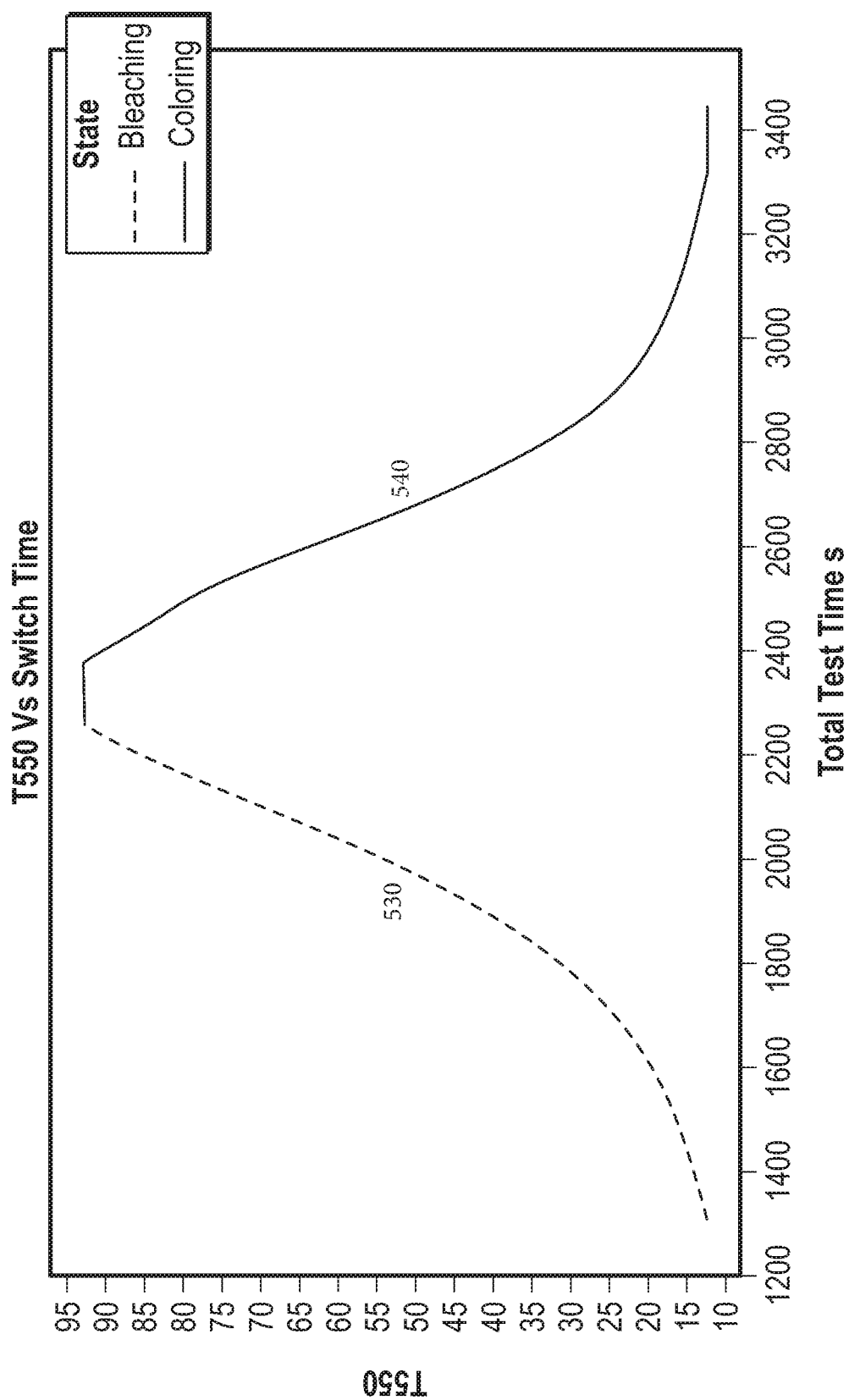
FIG. 6b shows T550 vs switch time of lithium tungsten oxide films as prepared according to one embodiment of the present disclosure.

FIG. 6B shows the T550 versus switching time for lithium tungsten oxide films in this Example for a bleaching cycle 530, and a coloring cycle 540. The sample started in the darkened state, where T550 was approximately 12.5%, and was then oxidized to the bleached state after approximately 1100 s, to a T550 of approximately 92.9%. The film was then reduced back to the darkened state in approximately 1100 s, back to a T550 of approximately 12.4%.

Figure 6C:
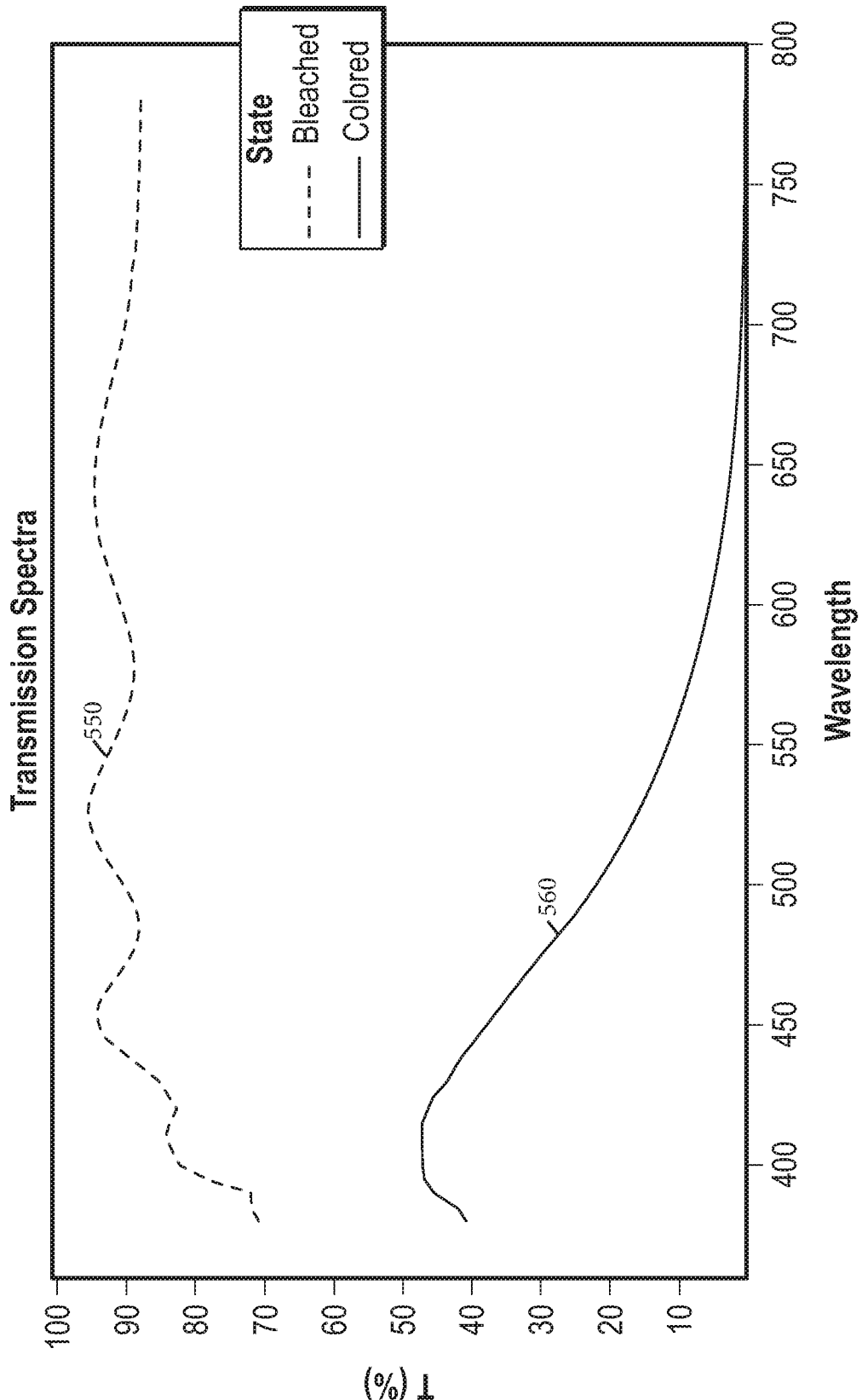
FIG. 6c shows transmission spectra of lithium tungsten oxide films as prepared according to one embodiment of the present disclosure.

FIG. 6C shows transmission spectra of lithium tungsten oxide films in this Example in an electrochemical half-cell in the bleached state 550 and the darkened state 560. The transmission at 550 nm is approximately 92.0% in the bleached state, and 11.6% in the darkened state.

Figure 6D:
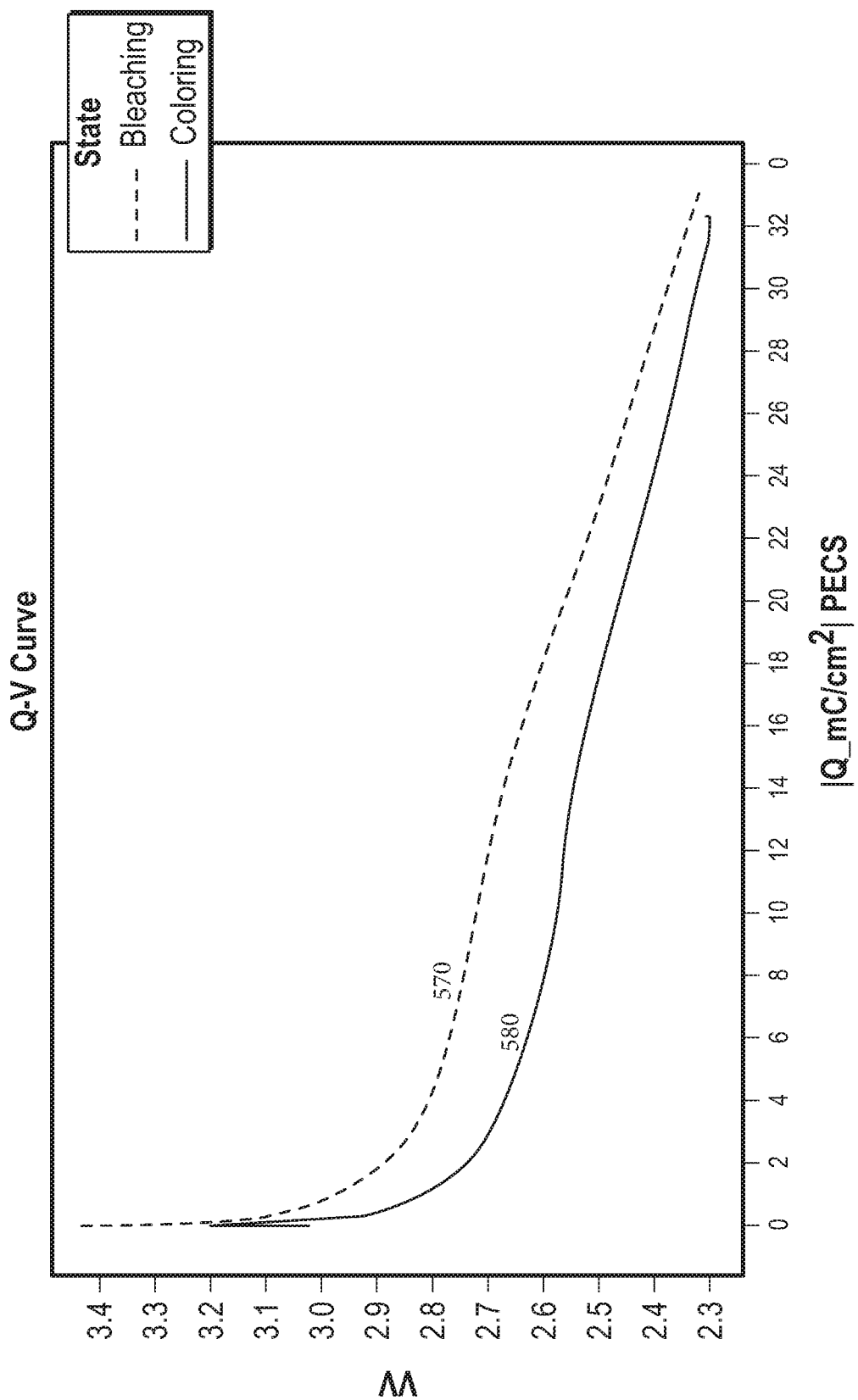
FIG. 6d shows a Q-V curve of lithium tungsten oxide films as prepared according to one embodiment of the present disclosure.

FIG. 6D shows Q-V curves, the potential (in volts) of lithium tungsten oxide films in the Example in an electrochromic half-cell versus the applied charge density Q (in $mC/cm^2$), during an oxidation cycle 570 and a reduction cycle 580. The blue curve shows the Q-V relationship during the oxidation cycle, and the orange curve shows the Q-V relationship during the reduction cycle. The figure shows that approximately 32 to 33 $mC/cm^2$ of charge were transferred to switch the device from a bleached state to a darkened state in this Example.

Additional properties of typical lithium tungsten oxide films of this Example are as follows. The capacity (of reduction) was from 25.19 to 36.28 $mC/cm^2$. The b* of the films in the initial state (after the films were prepared before any cycling took place) was from 0.77 to 2.66. The b* of the films after one bleaching cycle was from 0.81 to 2.71, and after one darkening cycle was from −35.18 to −39.88. The initial $T_{vis}$ (after the films were prepared before any cycling took place) was from 89.41% to 93.04%. The $T_{vis}$ after one bleaching cycle was from 89.55% to 93.19%, and after one darkening cycle was from 9.38% to 15.39%.

The properties of one exemplary lithium tungsten oxide film of this example are as follows. The capacity (of reduction) was 30.78 $mC/cm^2$. The b* of the film in the initial state (after the film was prepared before any cycling took place) was 1.05. The b* of the film after one bleaching cycle was 1.05, and after one darkening cycle was −43.51. The initial $T_{vis}$ (after the film was prepared before any cycling took place) was 91.85. The $T_{vis}$ after one bleaching cycle was 91.90%, and after one darkening cycle was from 12.01%.

Example 2: Lithium Tungsten Oxide Electrochromic Devices

Five layer devices were assembled using lithium tungsten oxide cathodic films prepared according to the sol-gel methods described sol-gel processes described above, with the exception that the cathode and anode films in this Example were coated onto roughly 75 cm×130 cm pieces of ITO coated glass before being made into 5-layer devices. The data in this Example were obtained by sequential oxidation and reduction under potentiostatic control cycling voltage between 1.5 and −0.9 V, the anode being connected to the positive lead, at 25° C. Cycles were switched when the absolute residual current fell below 5 µA. Optical data were recorded every 1-5 s.

Figure 7A:
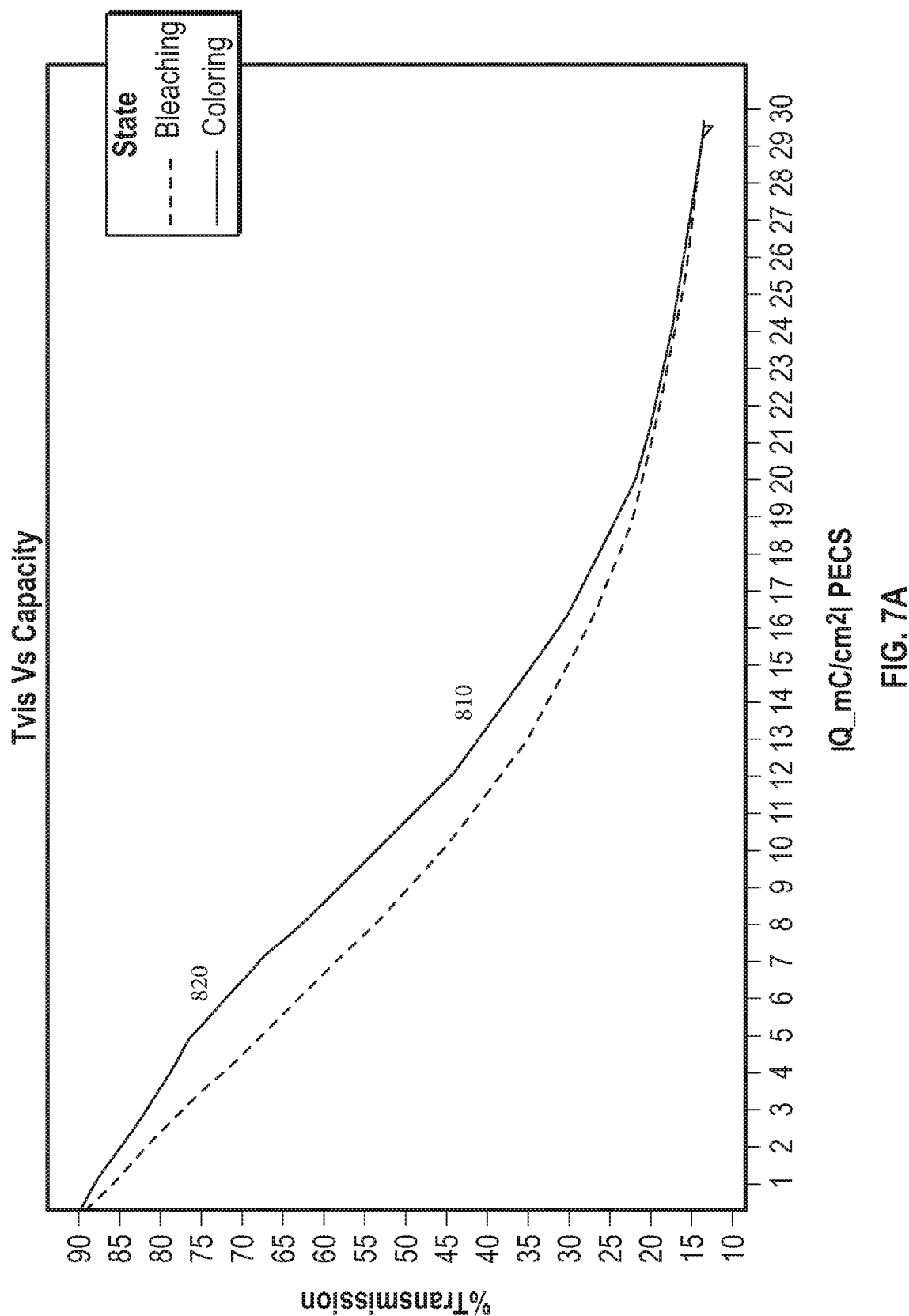
FIG. 7a shows Tvis vs capacity of lithium tungsten oxide films as prepared according to one embodiment of the present disclosure.

FIG. 7A shows the Tvis versus capacity for the initial cycling of the 5-layer devices in this Example for a coloring cycle 810, and a bleaching cycle 820. In the bleached state, this device had a Tvis of approximately 72%, and in the darkened state (after approximately 27 $mC/cm^2$ of additional charge) this device had a Tvis of approximately 3%.

Figure 7B:
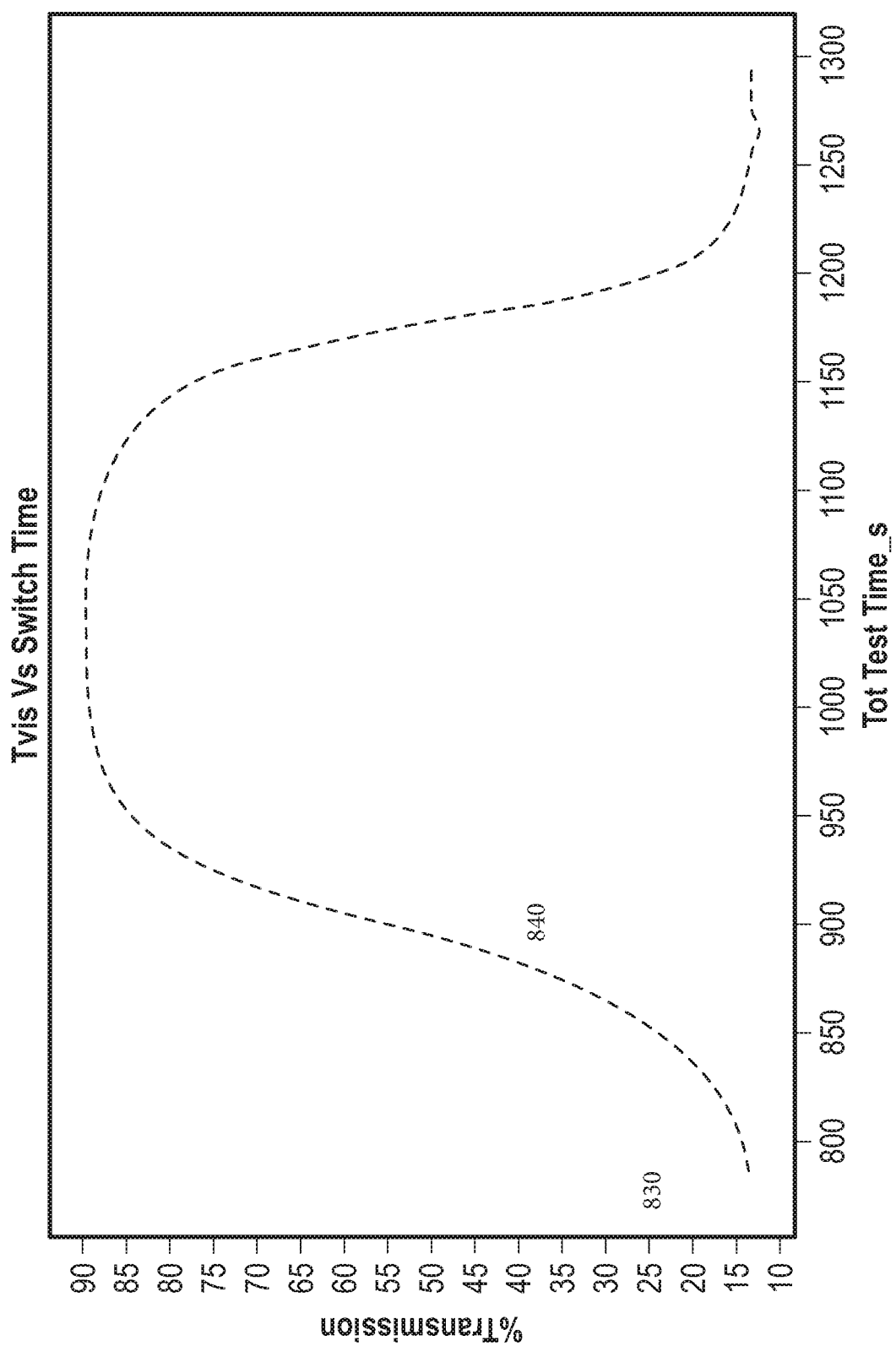
FIG. 7b shows Tvis vs switch time of lithium tungsten oxide films as prepared according to one embodiment of the present disclosure.

FIG. 7B shows the Tvis versus switching time for the initial cycling of the 5-layer devices in this Example for a coloring cycle 830, and a bleaching cycle 840. The sample started in the bleached state, where Tvis was approximately 71%, and was then reduced to the darkened state after approximately 370 s, to a Tvis of approximately 3%. The device was then oxidized back to the bleached state in approximately 400 s, back to a Tvis of approximately 77%.

Figure 7C:
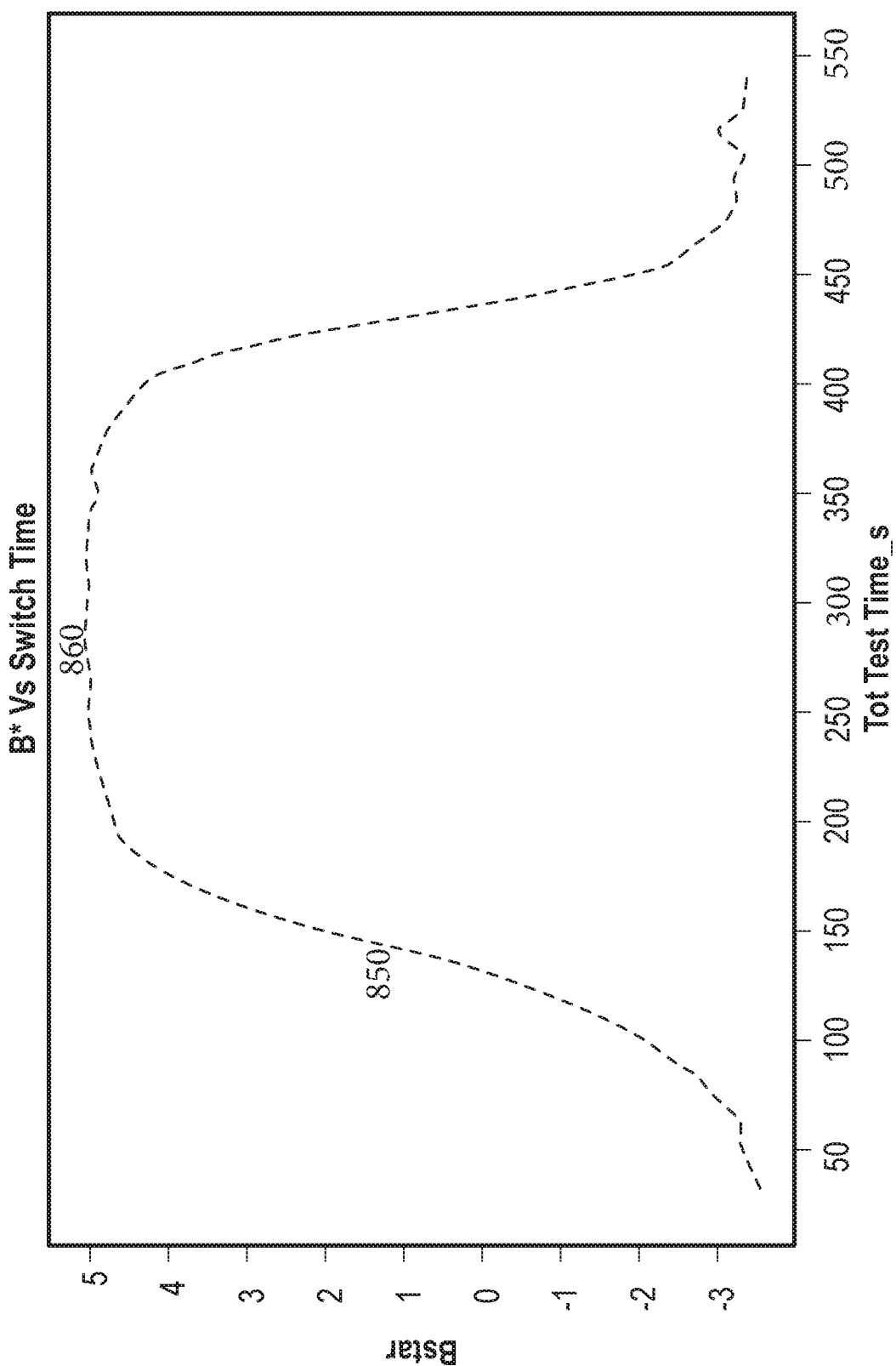
FIG. 7c shows b* vs switch time of lithium tungsten oxide films as prepared according to one embodiment of the present disclosure.

FIG. 7C shows the b* versus switching time for the initial cycling of the 5-layer devices in this Example for a coloring cycle 850, and a bleaching cycle 860. The sample started in the bleached state, where b* was approximately 5, and was then reduced to the darkened state after approximately 370 s, to a b* of approximately −5.5. The device was then oxidized back to the bleached state in approximately 50 to 100 s, back to a b* of approximately 4.

Figure 7D:
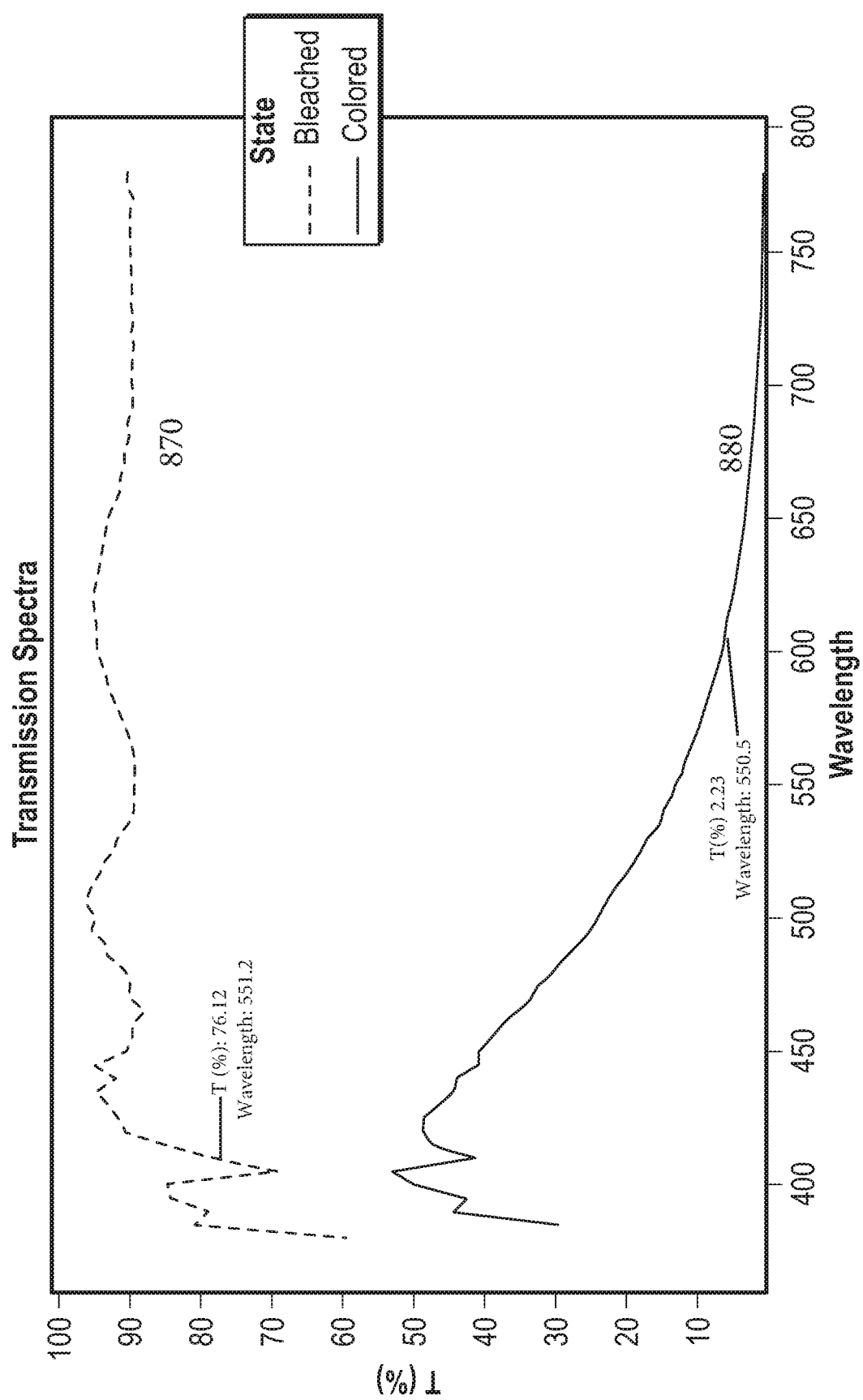
FIG. 7d shows transmission spectra of lithium tungsten oxide films as prepared according to one embodiment of the present disclosure.
Figure 7E:
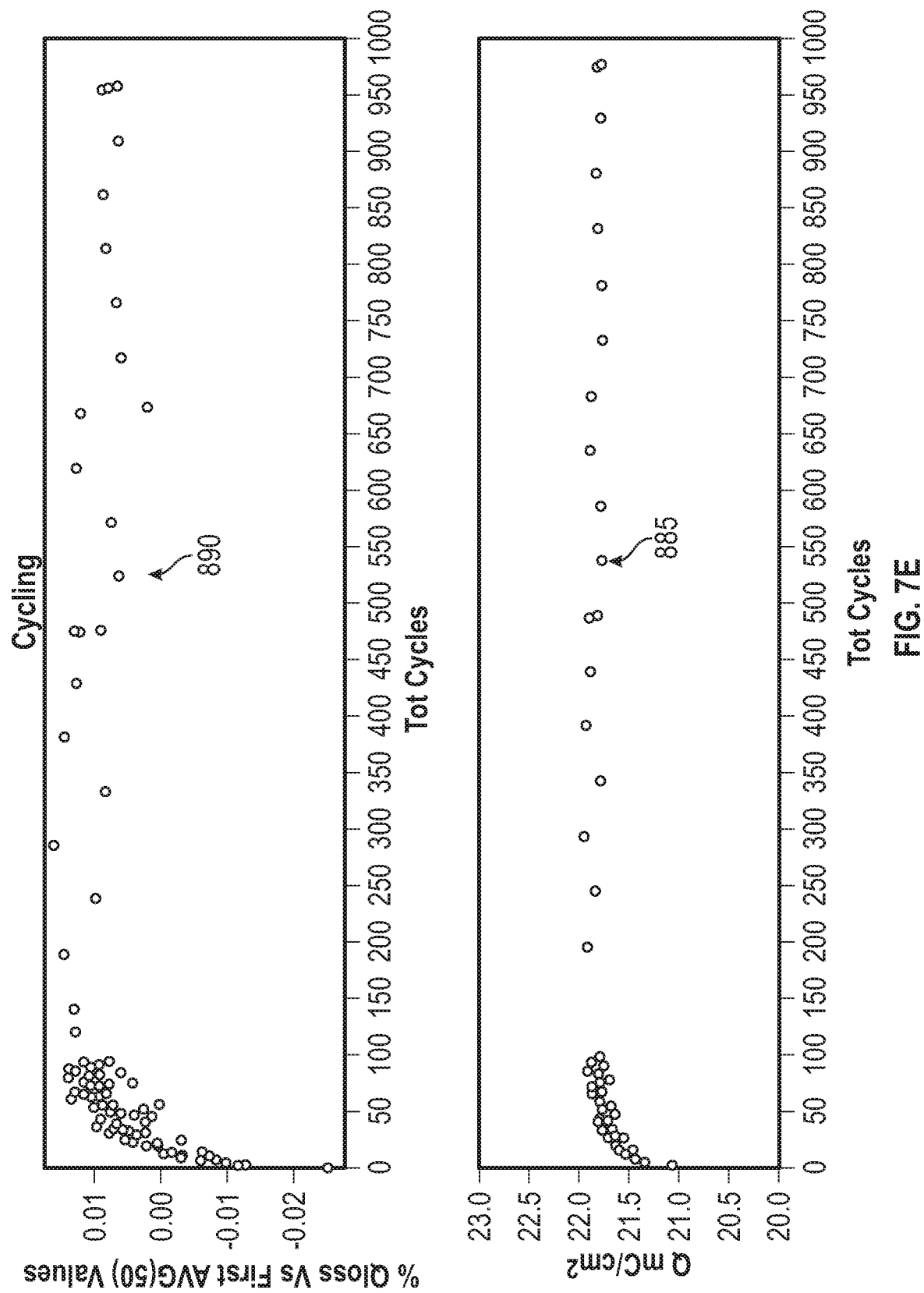
FIG. 7e shows a Q-V curve of lithium tungsten oxide films as prepared according to one embodiment of the present disclosure.

FIG. 7D shows transmission spectra for the initial cycling of the devices in this Example in the bleached state 870 and the darkened state 880. The transmission at 550 nm is approximately 76.1% in the bleached state, and 2.2% in the dark state.

The devices of this Example were also subjected to extended durability testing under illumination. In this Example, the devices were cycled from a bleached state to a darkened state and back to the bleached state 1000 times, at 85° C., and under a solar simulator operating at 1000 $W/m^2$ (i.e., exposed to illumination approximating the solar spectrum with an intensity of approximately 1000 $W/m^2$). Each cycle was performed using applied potentials of 1.35V and −0.3V, with step times of 5 minutes each for both bleaching and darkening steps in each cycle. FIG. 8E shows durability data for the devices in this Example. The top graph in FIG. 8E shows the percentage charge capacity loss over the test duration compared to the average charge capacity of the first 50 cycles. The bottom graph in FIG. 8E shows the absolute charge capacity for the device over the durability test duration. The data points 890 in the top graph in FIG. 8E show that the capacity change over the duration of the durability test is approximately +/−1%, or less than 1% in magnitude. The data points 895 in the bottom graph in FIG. 8E show that the absolute change in capacity over the duration of the durability test is approximately 0.5 $mC/cm^2$ to 1 $mC/cm^2$.

Example 3: Lithium Tungsten Oxide Film Compositions

Thin film lithium tungsten oxide samples on ITO/glass substrates were prepared according to the sol-gel processes described above.

Figure 8:
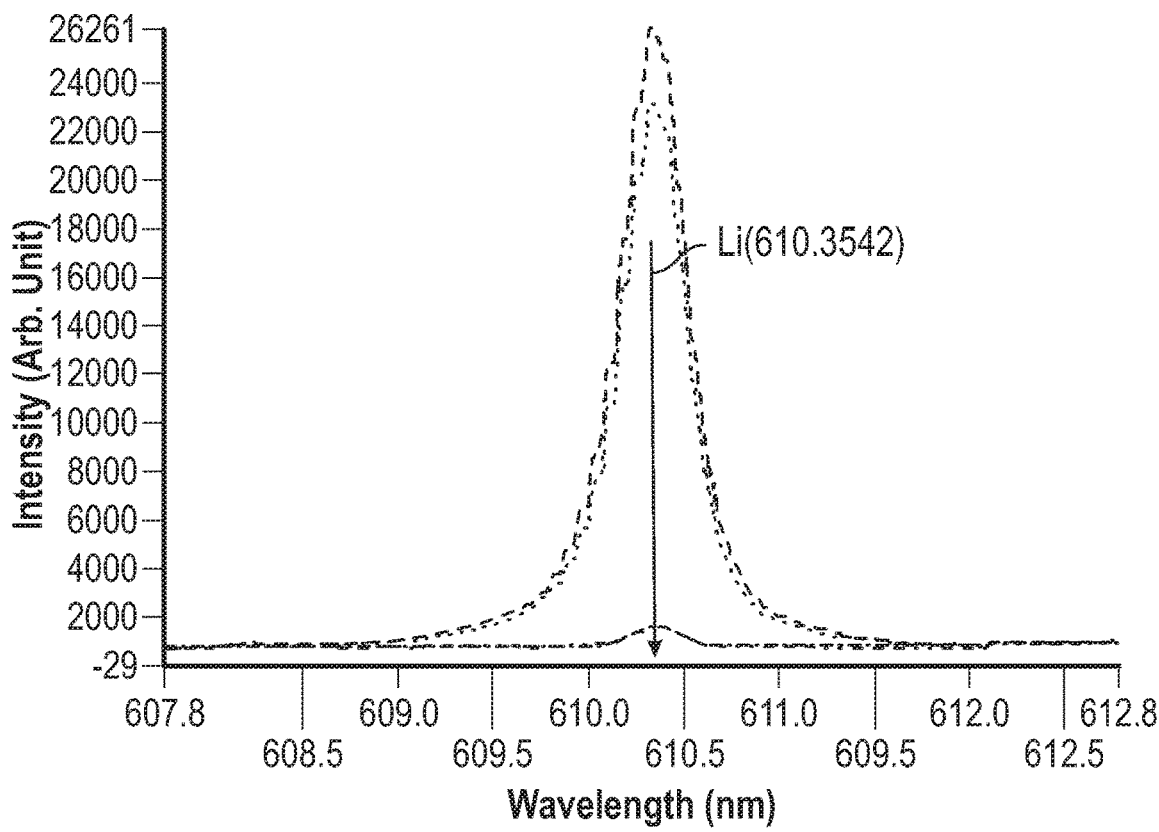
FIG. 8 shows Laser-Induced Breakdown Spectroscopy data (LIBS) of two lithium tungsten oxides films.
Figure 8:
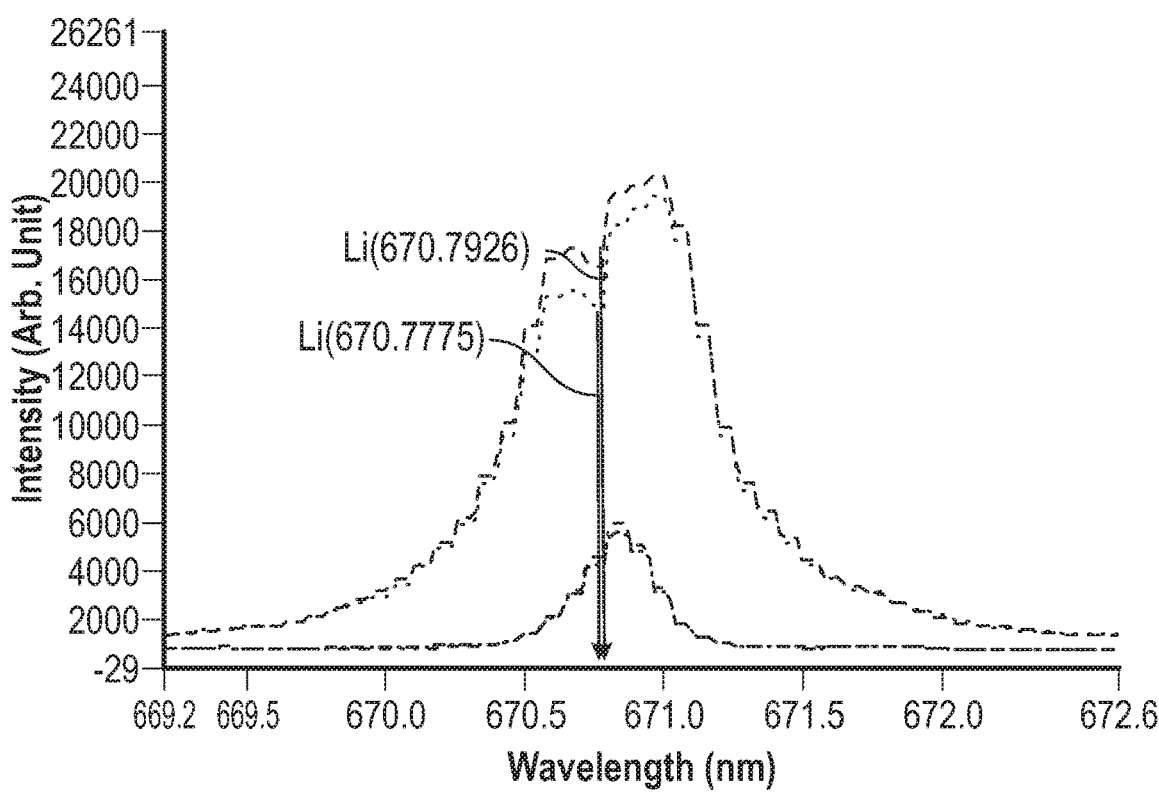
Figure 8:
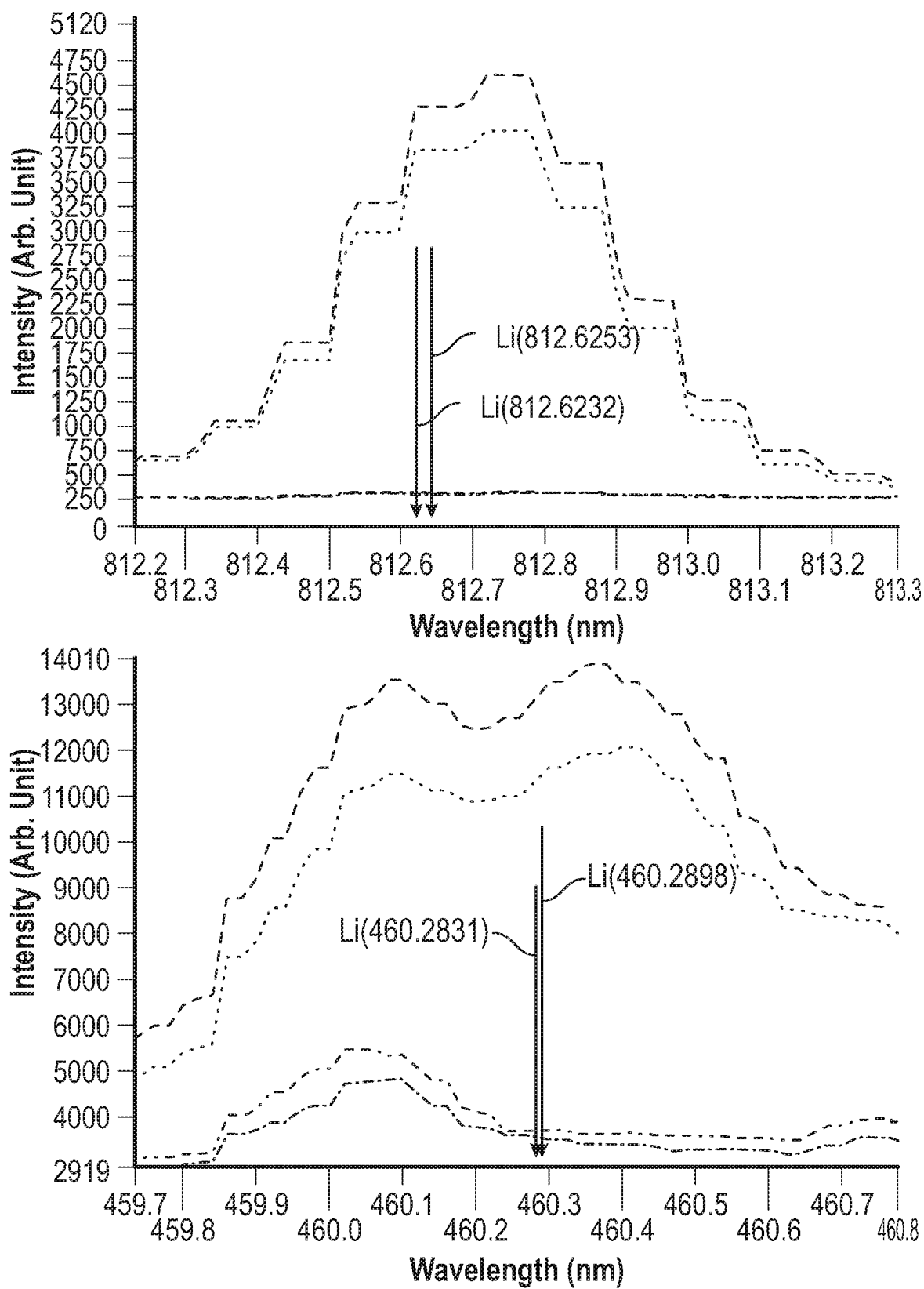

The composition of the films was measured by laser-induced breakdown spectroscopy (LIBS), and showed that the films had an atomic ratio of the amount of lithium to the amount of tungsten from 0.1 to 0.5. Two example LIBS spectra demonstrating the presence of lithium in the films in the bleached state are shown in FIG. 8, with Li:W ratios within the range described.

The composition of the films was also measured by inductively coupled plasma mass spectrometry (ICP-MS), and showed that the films had an atomic ratio of the amount of lithium to the amount of tungsten from 0.001 to 0.5, or from 0.001 to 0.01, or from 0.1 to 0.5, or from 0.1 to 0.35. Li:W ratios of several films measured by ICP are listed in Table 4. Samples 6a-6l have somewhat different Li:W ratios reflective of different sol-gel process conditions. Samples 6a and 6b were intentionally deposited with a lower Li:W ratio than samples 6c-6l.

TABLE 4

Lithium to tungsten ratios for several example lithium tungsten oxides films of this Example, as measured by ICP.

| Sample No. | Lithium:Tungsten |
|---|---|
| 6a | 0.0011 |
| 6b | 0.01036 |

TABLE 4-continued

Lithium to tungsten ratios for several example lithium tungsten oxides films of this Example, as measured by ICP.

| Sample No. | Lithium:Tungsten |
|---|---|
| 6c | 0.1377 |
| 6d | 0.14602 |
| 6e | 0.2267 |
| 6f | 0.241 |
| 6g | 0.259 |
| 6h | 0.2796 |
| 6i | 0.291 |
| 6j | 0.304 |
| 6k | 0.3146 |
| 6l | 0.3272 |

The films in this example were not incorporated into a half-cell or 5-layer device before the LIBS or ICP-MS measurements were done. Furthermore, no lithium was added to the films after synthesis. Therefore, it was concluded that the lithium in the lithium tungsten oxide films was provided during film synthesis, and was not provided after synthesis.

What is claimed is:

1. An electrochromic multi-layer stack comprising:
a thin film comprising lithium tungsten oxide with the formula $Li_xWO_{3+y}$ wherein x is greater than 0 and less than or equal to 1, and y is greater than 0 and less than or equal to 0.5 in the fully bleached state;
an electrically conductive layer; and
an outer substrate,
wherein the electrochromic multi-layer stack has a Tvis greater than 80% in the fully bleached state.

2. The electrochromic multi-layer stack of claim 1, further comprising:
L* from 80 to 100 in the fully bleached state;
a* from −10 to 10 in the fully bleached state; and
b* from −5 to 5 in the fully bleached state.

3. The electrochromic multi-layer stack of claim 1, further comprising:
b* from −5 to 5 in the fully bleached state.

4. The electrochromic multi-layer stack of claim 1, further comprising:
a darkened state Tvis less than 15%.

5. The electrochromic multi-layer stack of claim 1, further comprising:
a coloration efficiency greater than 10 $cm^2/C$.

6. The electrochromic multi-layer stack of claim 1, further comprising:
a switching rate from −1 to 0.

7. The electrochromic multi-layer stack of claim 1, wherein the lithium tungsten oxide is partially crystalline.

8. The electrochromic multi-layer stack of claim 1, wherein the lithium tungsten oxide has a perovskite crystal structure.

9. The electrochromic multi-layer stack of claim 8, wherein the lithium tungsten oxide has a perovskite crystal structure with a space group P4/nmm.

10. The electrochromic multi-layer stack of claim 8, wherein the lithium tungsten oxide has a perovskite crystal structure with a space group P4/nmm, and lattice parameters of a=b=from approximately 5.2 angstroms to approximately 5.3 angstroms, and c=from approximately 3.8 angstroms to approximately 3.9 angstroms.

11. The electrochromic multi-layer stack of claim 8, wherein the lithium tungsten oxide has Raman peaks at approximately 805 $cm^{-1}$, at approximately 950 $cm^{-1}$, at approximately 680-715 $cm^{-1}$, and at approximately 270 $cm^{-1}$.

* * * * *